United States Patent [19]

Chang et al.

[11] Patent Number: 4,933,616

[45] Date of Patent: Jun. 12, 1990

[54] DRIVE CONTROL SYSTEM FOR IMPRINTING APPARATUS

[75] Inventors: Sung S. Chang, Stamford; Hans C. Mol, Wilton, both of Conn.

[73] Assignee: Pitney Bowes Inc., Stamford, Conn.

[21] Appl. No.: 87,267

[22] Filed: Aug. 19, 1987

[51] Int. Cl.[5] .............................................. G05B 19/10

[52] U.S. Cl. .................................... 318/561; 388/904; 388/828; 318/567; 364/471

[58] Field of Search ........................ 318/561, 563–565, 318/671, 685, 567, 569, 600, 615–617; 101/45, 91; 364/464.02, 469, 471, 516–518; 388/825–828, 830–835, 904

[56] References Cited

U.S. PATENT DOCUMENTS

| | | | |
|---|---|---|---|
| 3,904,946 | 9/1975 | Dlugos et al. | 318/685 |
| 3,978,457 | 8/1976 | Check et al. | 340/172.5 |
| 4,016,467 | 4/1977 | Hallenbeck | 318/604 |
| 4,050,374 | 9/1977 | Check | 101/91 |
| 4,251,874 | 2/1981 | Check | 364/900 |
| 4,253,015 | 2/1981 | McFiggans et al. | 235/92 FP |
| 4,259,902 | 4/1981 | Eckert et al. | 101/91 |
| 4,393,454 | 7/1983 | Soderberg | 364/518 |
| 4,421,023 | 12/1983 | Kitteredge | 101/95 |
| 4,471,441 | 11/1984 | Check | 364/466 |
| 4,601,240 | 7/1986 | Sette | 101/91 |
| 4,603,627 | 10/1986 | Pollak et al. | 101/91 |
| 4,805,111 | 2/1989 | Steidel | 364/469 |

*Primary Examiner*—William M. Shoop, Jr.
*Assistant Examiner*—David Martin
*Attorney, Agent, or Firm*—Charles G. Parks, Jr.; David E. Pitchenik; Melvin J. Scolnick

[57] ABSTRACT

The mailing machine includes a print drum and shutter bar assemblies and a transport system for receiving seriately and assuming displacement control over envelopes from a feed means. The mailing machine drive control system is a microcomputer in control of a first stepper motor which is a driving communication with the transport system, a second motor in driving communication with the print drum assembly and a third motor in driving communication with the shutter bar assembly. A speed sensing means inform the microcomputer of the incoming velocity of an envelope and a trigger sensing means informs the microcomputer of the relative position of the envelope with respect to the transport system and printing station. The microcomputer is programmed to determine the peak drum speed relative to the speed of an incoming envelope and a preselected pitch distance between successive envelopes. Subsequent to the transport system assuming control over the envelope, the microcomputer causes the transport system to speed adjust to a speed equivalent to the peak drum speed and, further, subsequent to indicia printing by the postage meter print drum, causes the transport system to speed adjust to the previously determined IN-SPEED. The microcomputer causes the print drum and shutter bar to displace in a defined manner pursuant to a defined velocity profile under controlled accelerations such that the envelopes displacement relative to the printing station is synchronous with the peak drum speed for indicia printing by the print drum at the printing station.

8 Claims, 19 Drawing Sheets

| FIG. 6A | FIG. 6B |
| --- | --- |

DRIVE CONTROL SYSTEM FOR IMPRINTING APPARATUS

BACKGROUND OF THE INVENTION

The invention relates to a drive control system for an imprinting apparatus and, more particularly, to a drive control system for a mailing machine and interfaceable postage meter.

Generally, high speed mailing system will include an inserter which seriately delivers envelopes to a mailing machine postage meter for indicia printing on the individual mailpieces. Customarily, the mailing machine includes a transport arrangement which delivers the individual mailpieces received from the inserter to a printing station whereupon the attached postage meter prints an indicia on the mailpiece and subsequently thereto the transport system ejects the mailpiece therefrom for further processing or collection. It is noted that it is also customery for the mailing machine to include a postage meter drive arrangement which is coupled to the postage meter when the postage meter is mounted on a mailing machine for driving the postage meter print drum and displacing a postage meter security member commonly comprising a shutter bar assemble interlocking to the print drum drive assembly.

With respect to such high speed systems, the postage meter represents the limiting factor for system throughput. This is because it is a requirement that the postage meter print drum be brought to a complete stop and the security system engaged and disengaged with each print cycle of the postage meter. This requires that during each cycle, the shutter bar mechanism within the postage meter must be actuated to a non-inhibiting position prior to actuation of the print drum. Additionally, prior to the indicia printing, the print drum must be accelerated to a constant speed. The postage indicia and the advertisement slogan are usually printed while the drum is at the constant speed referred to as the "slew speed". After the printing, the drum must then be decelerated to a home or stop position and the shutter bar must be pulled back to the home, print-inhibiting position. When the drum is at the constant "slew speed", the tangential velocity on the surface of the drum must be equal to the mail velocity at the print location controlled by the transport system. Unless one is willing to buckle the mail, or the system has a capability to slow down the mail, the mail speed at the print location must be equal to or slightly greater than the mail ejection speed of the inserter. In order to increase the system throughput, the inserter must increase the mail ejection speed. This would require the print drum to have higher constant "slew speed" and the magnitudes of the accelerations for the print drum and the shutter bar would also have to be increased. So a conventional design approach for a faster mailing system would call for larger meter drive motors to achieve higher speed and provide larger torque. But this would increase the physical size, the power consumption, the heat dissipation, and the overall system cost of the machine. Further more, operating the meter at a higher speed and larger magnitudes of acceleration and deceleration would promote premature wear in the meter and the meter drive assembly.

SUMMARY OF THE INVENTION

It is therefore an objective of the present invention to present a means to increase the system throughput of a postage meter mailing machine without adversely affecting the system's wear characteristic.

A mailing machine and a postage meter are arranged in such a way that the postage meter is detachably mounted to the mailing machine to define a print station. The mailing machine includes a drive mechanism for transporting the mailpieces, a second drive mechanism for rotating the meter drum, and a third independent drive mechanism for moving the shutter bar of the postage meter. All three drive mechanisms are under the control of a microcomputer. In communication with the microprocessor, there are 2 optical sensors for sensing the speed of incoming mail, an optical "trip sensor" and a "shutter bar sensor" for monitoring the meter condition.

Under the control of the microcomputer, the transport system of the mailing machine is accelerated to a given speed at the start-up time. The mailing machine receives mailpieces (also referred to as envelopes) from an inserter in a seriate manner, usually at a fixed pitch distance between the lead edges of two successive envelopes. Upon receipt of each envelope from the inserter, the microcomputer estimates the speed of the incoming envelope and sets a variable called IN-SPEED to be slightly greater than the estimated incoming mail speed. It also selects a constant "slew speed" for the print drum which is usually considerably slower than the incoming mail speed. When the lead edge of the envelope passes the trip sensor, the microcomputer determines and executes appropriate delays then starts to trip the meter and to slow down the transport system, so that at the printing time the speed of the mailpiece is equal to the constant "slew speed" of the print drum on the circumference. When the printing is finished, the mailpiece no longer has contact with the print drum, so the microcomputer can accelerate the transport system from the drum "slew speed" to the faster IN-SPEED, and decelerate the meter drum from the "slew speed" to the zero speed at the same time. Early acceleration of the transport system makes it ready to accept the next incoming mailpiece at a matching speed so that the mailpiece would not buckle. With the speed sensing and rapid speed adjustment capability, the mailing machine can accept incoming mails of very wide speed range from different kinds of inserters, and can quickly slow down the mailpiece so that the meter drum can be operated at a speed considerably slower than the mail ejection speed of the inserter. In this manner, the mailing system throughput can be increased without utilizing larger meter drive motors, and the wear on the postage meter mail machine drive systems can be significantly reduced.

In addition to the mail slowdown capability, the microcomputer is programmed such that the forward displacement of the shutter bar and the initial rotation of the print drum occur simultaneously so that the overall trip cycle time is reduced by about 6 percent. This time-overlap method also allows the operating speed of the postage meter to be further reduced for a given throughput requirement. The microcomputer is also programmed to monitor the drum and shutter bar sensors frequently. If errors are detected in the drum or shutter bar movement, the microcomputer will attempt to recover the system to the "home" state and shut down itself in most cases. Mail flow errors such as mail jam, mail skew and pitch too short are also detected by microcomputer.

DETAILED DESCRIPTION OF THE PREFERRED EMBODIMENT

Figure 1:
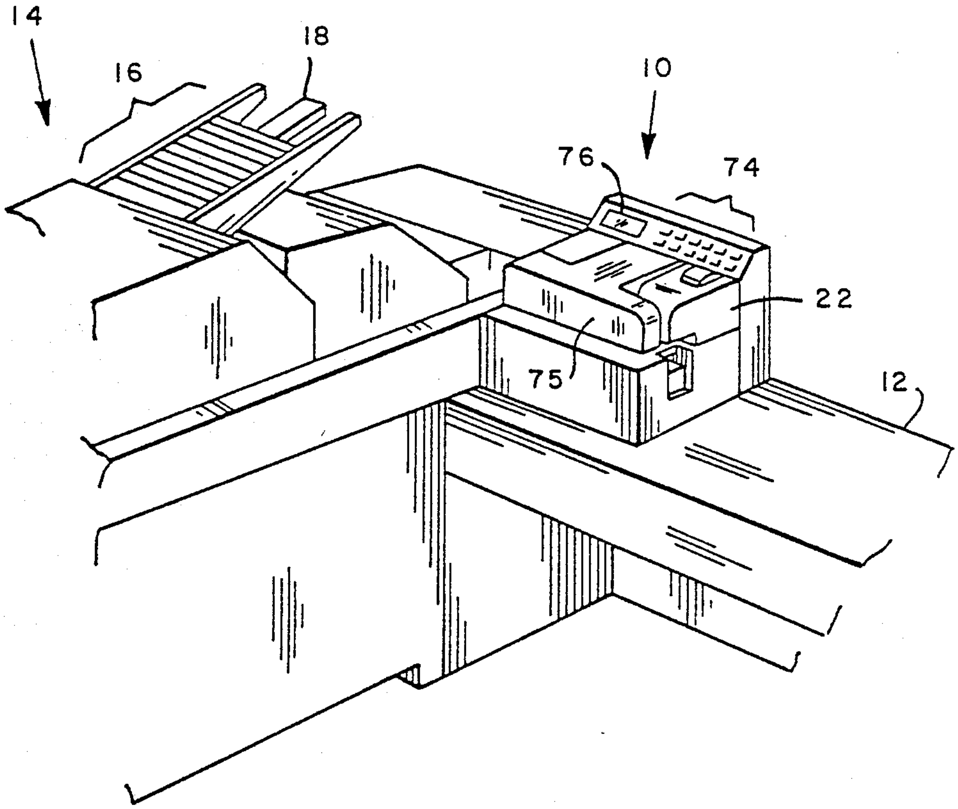
FIG. 1 is a perspective view of an inserter and cooperating postage meter mailing machine.
Figure 2:
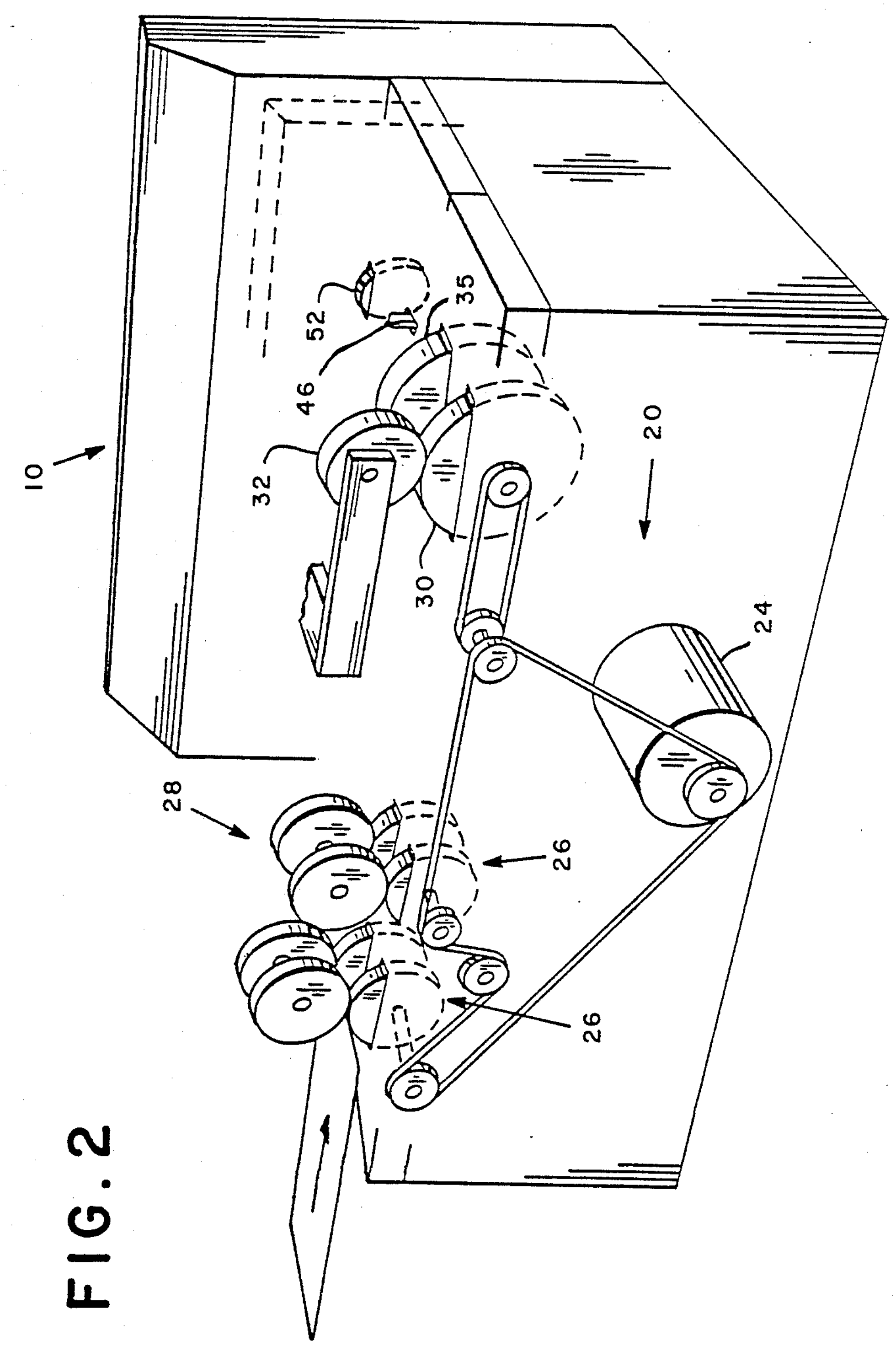
FIG. 2 is a schematic of the mailing machine drive transport system arrangement, particularly suited for the present invention.

Referring to FIGS. 1 and 2, there is shown a mailing machine, generally designated by the reference numeral 10, detachably mounted atop a support table 12 by any suitable means. The mailing machine 10 is positioned on the support table 12 at a right angle to a generally conventional inserter 14. Conventionally, a stack of envelopes 16 are deposited in the receiving trays 18 of the inserter 14. The inserter 14 performs in a conventional manner to deposit in each envelope a set of fill materials. The filled envelopes are then delivered to the mailing machine 10 in a seriate manner from the inserter 14. The mailing machine 10 includes transport assembly, generally indicated as 20, for transporting envelopes delivered by the inserter 14 to a postage meter 22 for the printing of an postage indicia thereon. A particularly suitable transport assembly 20 is more fully described in U.S. Pat. No. 4,787,311 incorporated herein by reference.

Generally, the transport assembly 20 includes a conveyor stepper motor 24 mounted within the mailing machine 10 which drives a plurality of lower rollers 26. A plurality or upper rollers 28 are rotatably mounted to the mailing machine 10 in peripheral alignment to a respective lower rollers 26. The stepper motor 24 also drives an impression roller 30. The transport system 20 further includes a roller 32 peripherally aligned to the roller 30. Generally, the transport assembly functions to maintain positive control over the traversing envelope and perform desired speed adjustment on each traversing envelope in a manner to be described subsequently.

Figure 3:
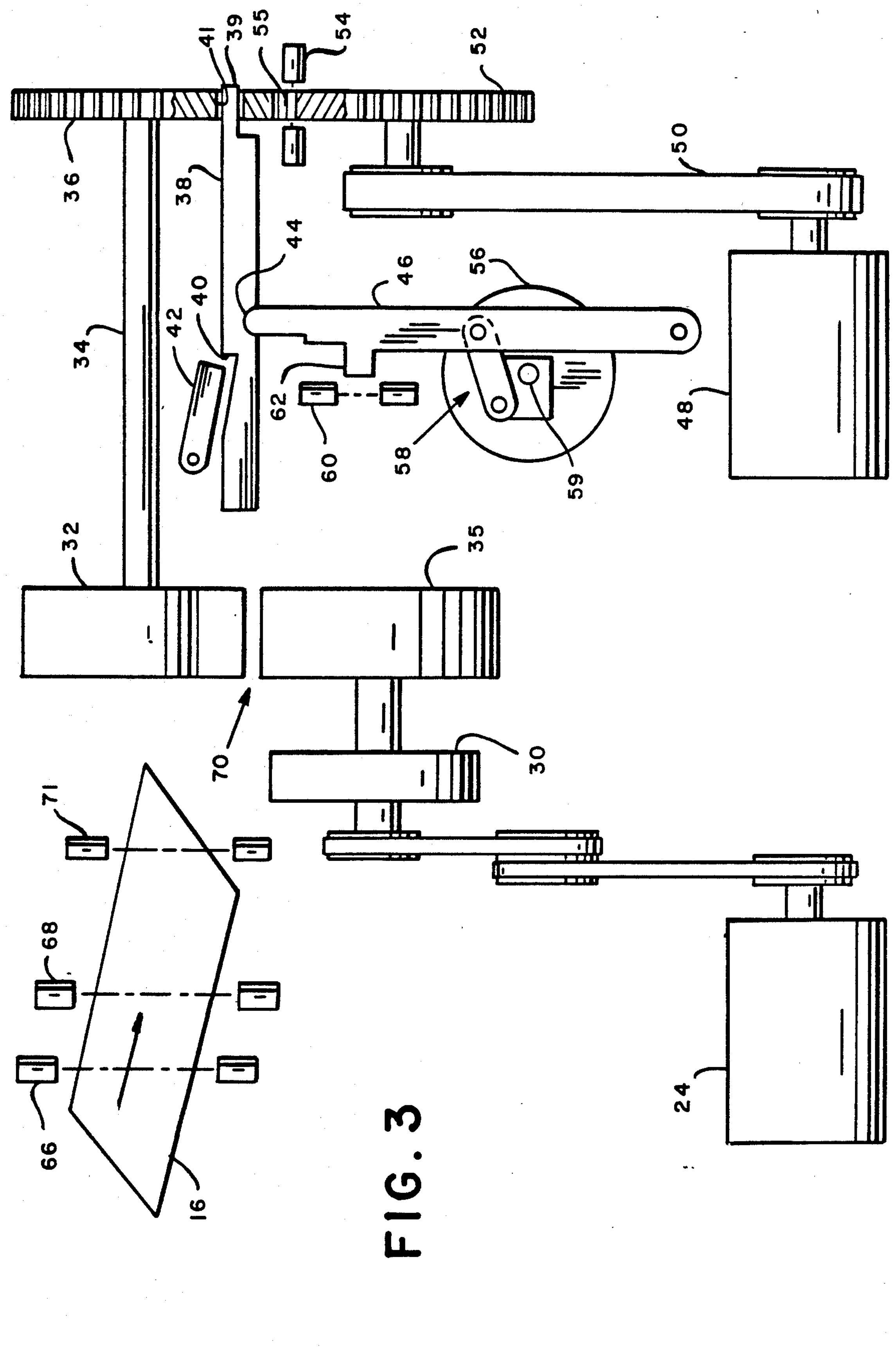
FIG. 3 is a schematic of the shutter bar and print drum assemblies of a postage meter and the corresponding drive mechanisms of the mailing machine particularly suitable for the present invention.

Referring more particularly to FIG. 3, a postage meter 22 well suited for operation with the present invention is offered by Pitney Bowes, Postage Meter Model Series 5300, and generally includes a print drum 32 fixably mounted to one end of a shaft 34 by conventional means, the shaft 34 being rotatably mounted in the postage meter by conventional means. An impression roller is rotatably mounted opposite the print drum. The other end of shaft 34 has a driven gear 36 fixably mounted thereto by any conventional means. Slidably mounted in a conventional manner within the postage meter 22 is a shutter bar 38 such that a tabbed end portion 39 of the shutter bar 38 can be slidably admitted to and withdrawn from aperture 41 in the gear 36. The shutter bar 38 is provided with a notch 40 for receiving the pawl or bail 42, which inhibits movement of the shutter bar when the pawl 42 is seated in the notch 40. The postage meter 22 further includes known means (not shown, but described in U.S. Pat. No. 4,302,821) for unseating the pawl which permits movement of the shutter bar 38 to its forward or released position pursuant to enabling of the postage meter print cycle. The shutter bar 38 is further provided with a notch 44 or the like for receiving the end of a shutter lever 46 described subsequently.

A print drum stepper motor 48 is fixably mounted within the base of the mailing machine 10 by conventional means for driving an endless belt 50 to provide driving communication between the stepper motor 48 and a gear 52. The gear 52 is rotatably mounted within the mailing machine 10 by any conventional means such that mounting of the postage meter 22 on the mailing machine 10 bring the gear 52 in constant mesh with the postage meter gear 36. An optical sensor 54 is fixably mounted within the mailing machine by conventional means such that a radial portion of the gear 52 is between the spaced arms of the sensor 54. The gear 52 is positioned such that optic communication between the sensor arms is blocked by the gear 52 except when the gear 52 is in the home position, i.e., the gear 52 includes single aperture 55, which permits optic communication between the sensor arms when the gear 52 is positioned in the home position which position is corresponding the print drum 32 home position.

A shutter bar stepper motor 56 is fixably mounted in the mailing machine in a conventional manner. The shutter bar lever 46 is mounted in a conventional manner pivotally at the other one of its ends in the mailing machine. Driving communication between the stepper motor 56 and shutter lever 46 is provided by a reciprocation brace 58 fixably mounted off-center to the output shaft 59 of the stepper motor 56. The brace is also pivotally mounted to the shutter lever 46 at a point therealong such that rotation of the stepper motor output shaft 59 causes the control lever 46 to experience reciprocating motion.

An optical sensor 60 is fixably mounted within the mailing machine such that when the shutter lever 46 is in a corresponding shutter bar 38 the forward or released position a tab 62 formed on the shutter lever 46 is in a blocking position between the arms of optical sensor 60.

Additional optical sensors (speed sensors) 66 and 68 are mounted to the mailing machine deck along the traversing path of a envelope 16 upstream of the printing station 70. The sensors 66 and 68 are so positioned as to assure traversal of the sensors by properly aligned traversing envelope. A print cycle trigger sensor 71 is mounted to the mailing machine located between the sensors 66 and 68 and the print station such that a traversing envelope traverses the printing station 70. A more detailed description of the mailing machine drive system is described in U.S. Pat. No. 4,864,505, herein incorporated by reference.

Figure 4:
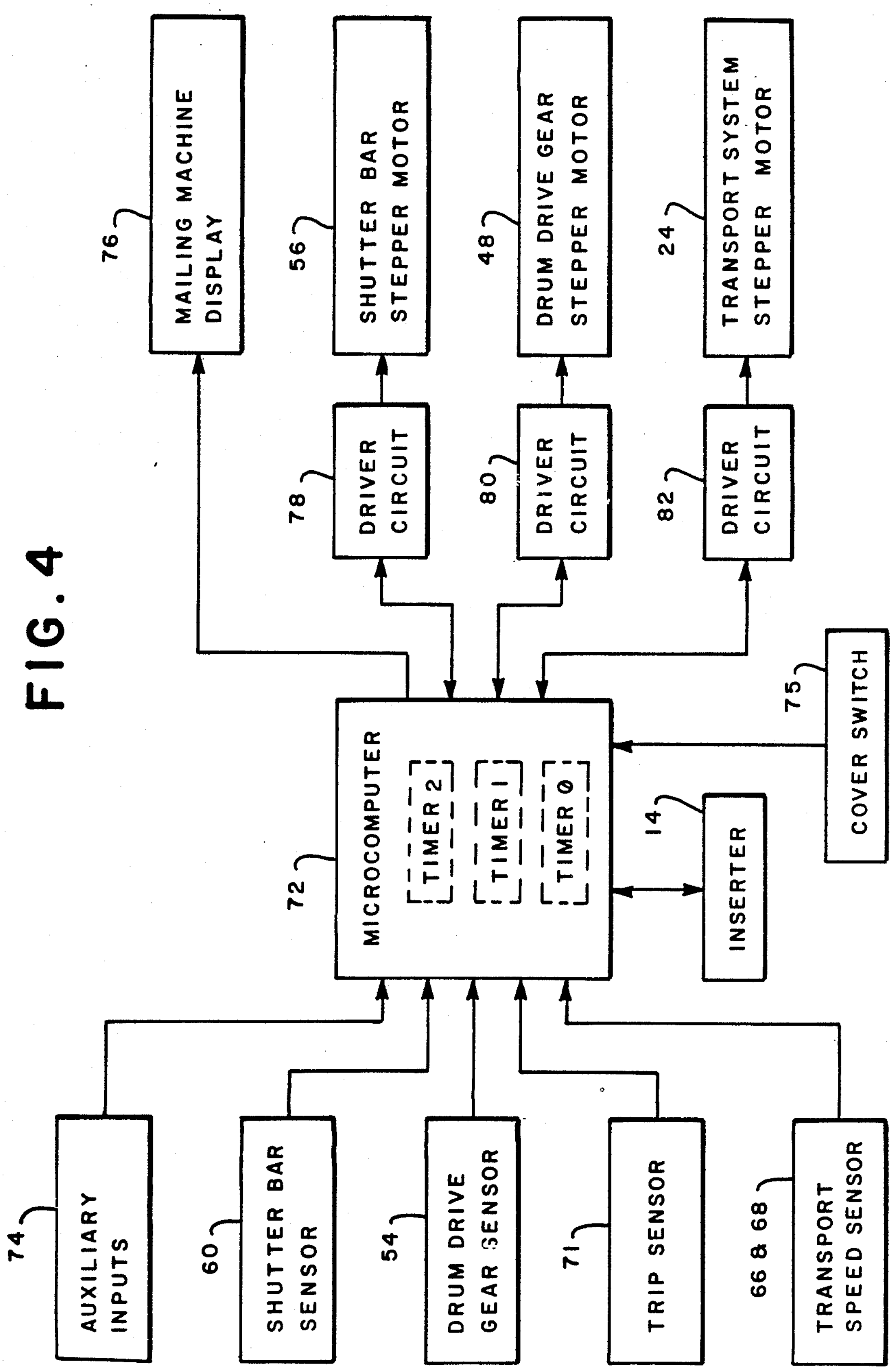
FIG. 4 is a schematic representation of the mailing machine microcomputer system in accordance with the present invention.

Referring now to FIG. 4, the mailing machine 10 further includes a microcomputer 72 which receives inputs from a plurality of means here being auxiliary input 74, e.g., a mailing machine keyboard, a shutter bar sensor 60, a print drum drive gear sensor 54, a trigger sensor 71, and transport assembly sensors 66 and 68. The microcomputer 72 is in communication with the inserter 14 and mailing machine cover 75 switch 74 (not shown in physical embodiment). In addition, the microcomputer 72 is in controlling communication with the mailing machine display 76, print drum stepper motor 48, the shutter bar stepper motor 56 and the transport stepper motor 24 in addition to the driver circuits 78, 80 and 82, respectively.

Generally, the microprocessor is programmed to determine the print drum slew speed (PDSS) in proportion to the envelope input speed (IN-SPEED). The proportion relation is defined by the ratio of a fixed absolute minimum pitch distance (K) relative to the mailing machines' pitch setting value (PSV). The PSV must be less than the associated inserter mail pitch.

$$PDSS = \frac{K}{PSV} \times \text{IN-SPEED} \quad (1)$$

K in the preferred embodiment equals 13.5

Operation

Generally the microcomputer 72 is programmed to determine and correspondingly cause the stepper motor 48 to rotate the print drum 32 at the print drum slew speed relative to the envelope input speed for a given pitch setting value. By so controlling the print drum slew speed, the nominal operating speed of the postage meter is substantially reduced. It is noted that pursuant to the determined print drum slew speed, the microcomputer causes the transport system to reduce the traversing envelopes' speed to a complementary level. The microcomputer 72 is further programmed to exercise control over the print cycle such that displacement of the shutter bar and the print drum are initiated simultaneously thereby decreasing the required print cycle time.

Figure 5:
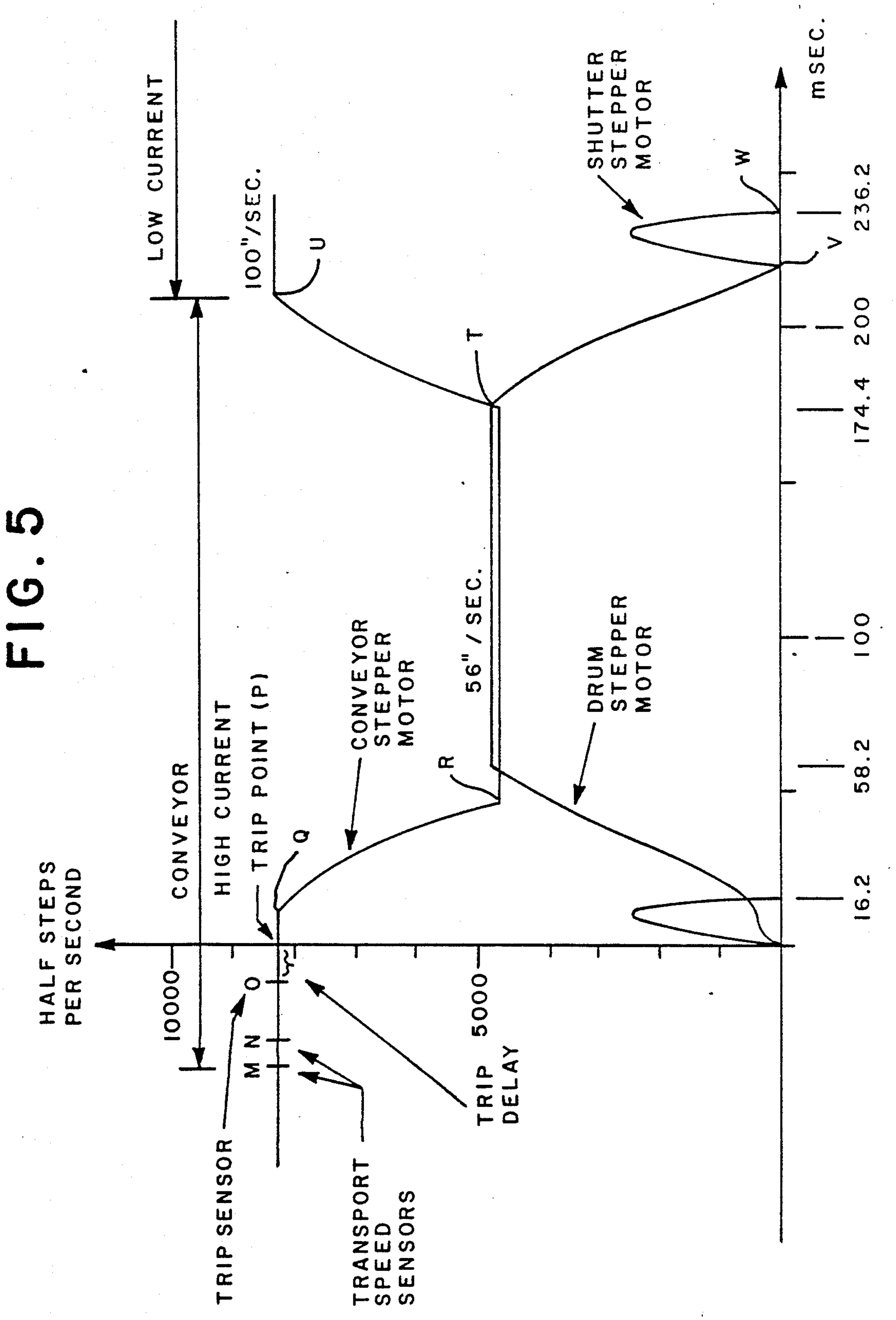
FIG. 5 is a graphic representation of the triggering sequence of the conveyor stepper motor, print drum motor and shutter bar motor of the system relative to speed sensors and trigger sensor actuation in accordance with the present invention.
Figures 6, 6A:
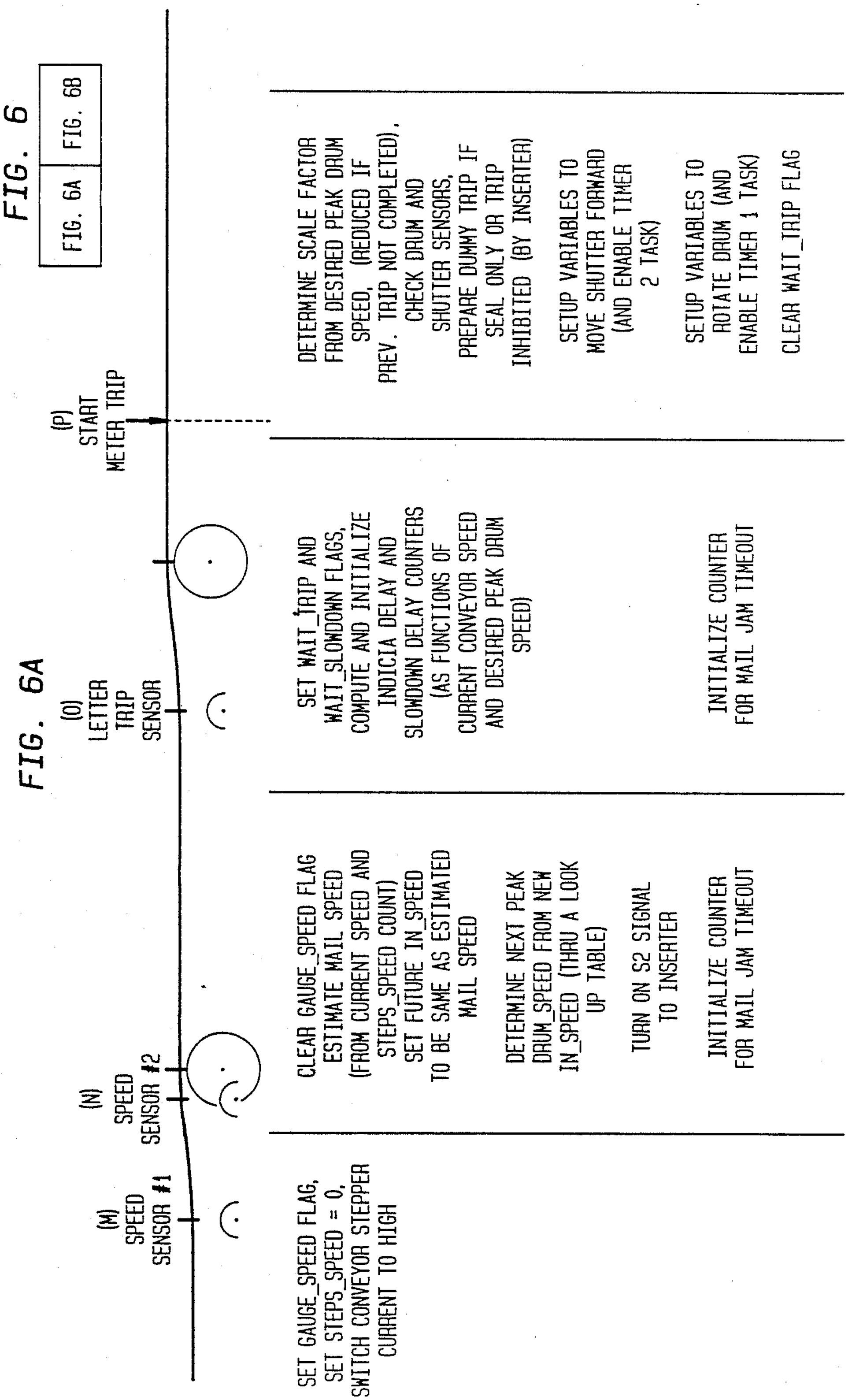
FIG. 6 shows the alignment for FIGS. 6A and 6B.
FIGS. 6A and 6B shows a general time sequence operation graphic representation of the function performed by the microcomputer's programming in accordance with the present invention.
Figure 6B:
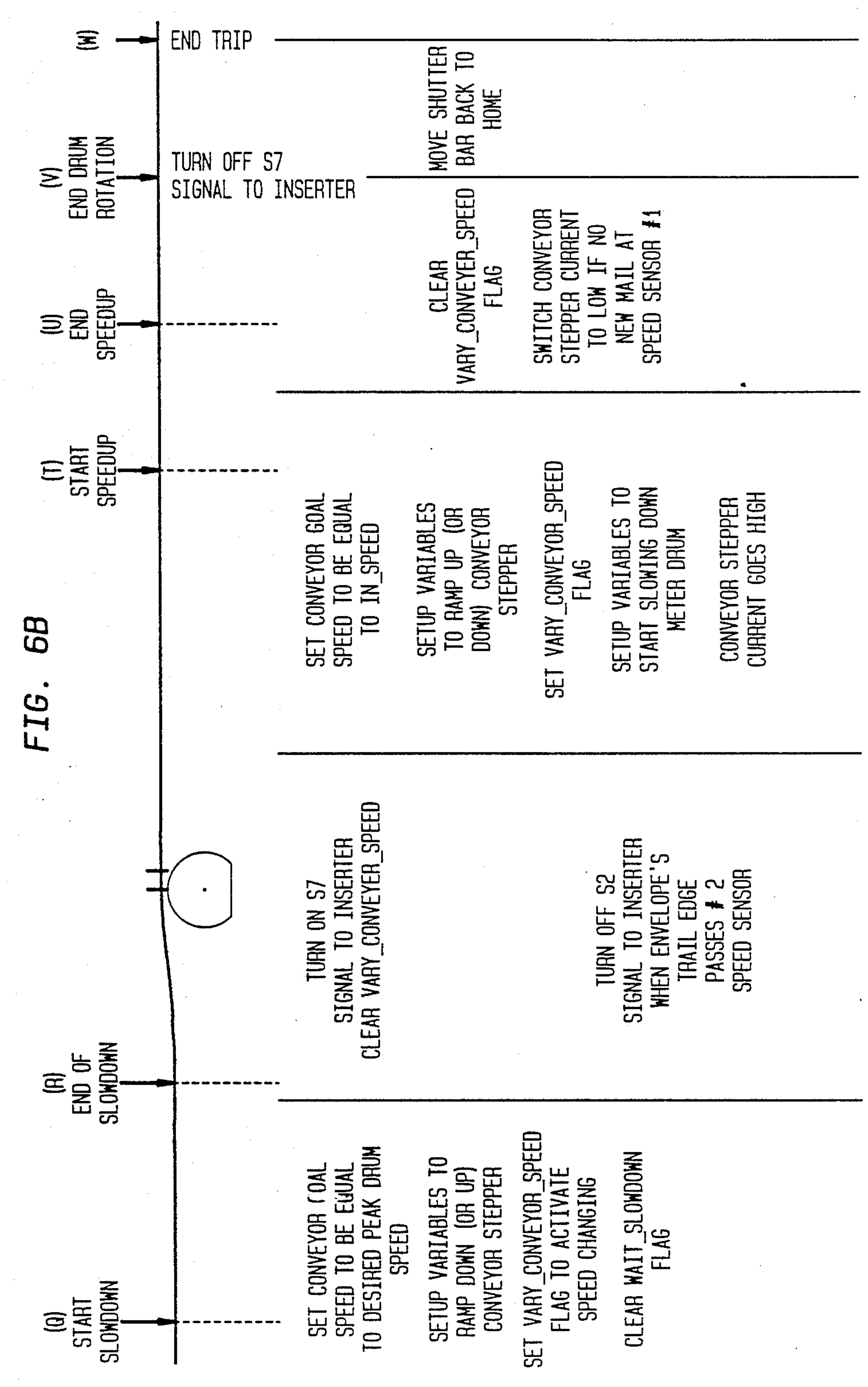

Referring more particularly to FIGS. 5, 6A and 6B, upon the arrival of an envelope's 16 leading edge at the first speed sensor 66, the microcomputer causes the conveyor driver circuit 32 current to go high and thereby causing higher torque output of the conveyor stepper motor 24. Also, the GAUGE-SPEED flag is set and the STEP-SPEED counter is set to zero. Upon the arrival of the envelope 16 leading edge to the second speed sensor 68 the microcomputer clears the GAUGE-SPEED flag and estimates the mail speed from the elapsed STEP-SPEED count and determines the new conveyor IN-SPEED. The value of IN-SPEED is chosen to be equal to or slightly greater than the mail speed to prevent crashing between the envelope's leading edge and the transport rollers 26 and 28. The microcomputer also determines the next PEAK-DRUM-SPEED (previously referred to as print drum slew speed) relative to the new IN-SPEED and turns on an S2 signal to the inserter 14 alerting the inserter 14 that a mailpiece has entered the mailing machine. Further, the mail jam timeout counter is initialized. Generally, the microcomputer is programmed to compare the elapsed mail presence count with a preselected count, whereby should the elapsed count exceed the preselected count, then an error occurred and the microcomputer modifies system parameter in an attempt to clear the jam by driving the system at a slower rate.

Upon arrival of the envelope's leading edge to the trip sensor 71 now under the control of the transport system 20, the program sets a WAIT-TRIP flag and a WAIT-SLOWDOWN flag. The microcomputer is programmed to compute and initialize an indicia delay counter which sets the Start Meter Trip or Trip Point and a slowdown delay counter which sets the start slowdown point as functions of the present conveyor speed and the previously computed PEAK-DRUM SPEED. At this point, the Mail Jam Timeout counter is reinitialized to a smaller value.

Upon arrival of meter trip point (P), the microcomputer program determines a scale factor based upon the computed PEAK-DRUM-SPEED. The drum drive gear sensor 54 and the shutter bar sensor 60 are also checked for proper trip position, i.e., the drum drive gear 52 and shutter bar 32 are in the home position. At this point, the program also checks to see whether the inserter 14 has communicated a no print signal or the machine is in the seal only mode set by the operation. If no print is required, instead of aborting the trip process, the microcomputer modifies parameters to make subsequent movement fictitious. Further at this point, the variables for the shutter bar displacement (Timer 2 enabled) and the print drum (Timer 1 enabled) are set up related to the determined scale factor. The WAIT-TRIP flag is then cleared and the trip process starts.

As the envelope's leading edge arrives at the start slowdown point (Q), the program then sets the conveyor GOAL SPEED, equal to the computed desired PEAK-DRUM-SPEED, sets variables to ramp down conveyor stepper motor 24, set VARY-CONVEYOR-SPEED flag to activate speed change, and clears the WAIT-SLOWDOWN flag.

As to the envelope's leading edge arrives at end of conveyor slowdown point (R), the program then turns "ON" the S7 signal to the inserter. The program also clears the VARY-CONVEYOR-SPEED flag to terminate the slowdown process.

Upon arrival of the envelope to point (T), the program initiates conveyor system 20 speed up and the print drum slowdown precipitated by release of influence on the envelope by the print drum. The conveyor speed now goes to IN-SPEED when the speedup process is complete at point (U) by setting conveyor GOAL-SPEED equal to IN-SPEED; setting up variables to ramp up the conveyor motor stepper motor 24; setting VARY-CONVEYOR-SPEED flag. The program also prepares to slow print drum by setting up variables to start print drum 32 slowdown.

As the envelope's leading edge encounters point (U), the program ends conveyor speed up and clears the VARY-CONVEYOR-SPEED flag. If a new envelope has not encountered the speed sensor 66 upon the arrival of the envelope at point (V), the current to the conveyor stepper motor 24 can be switched back to the low level. It is noted that at point (V), the print drum has been brought to its home position and the S7 signal to the inserter 14 is turned "OFF". The shutter bar is then pulled back to home by motor 56. Arrival of the envelope at point (W) occasions the end of the present trip.

Program Logic

Figure 7:
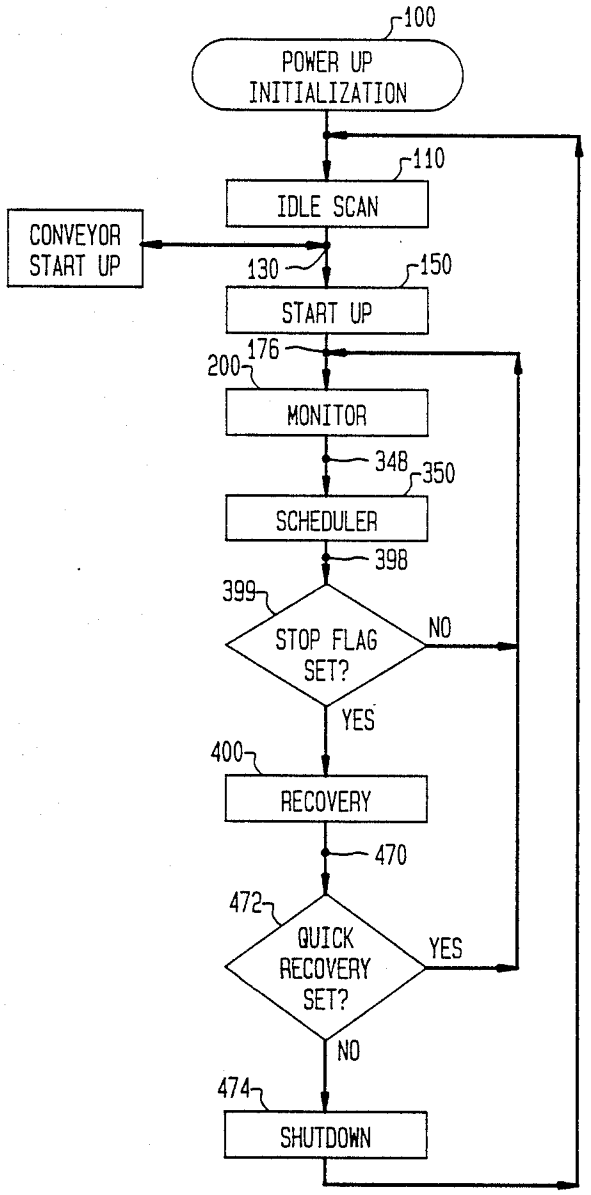
FIG. 7 is a flow chart representation of the logic of the overall programming for the microcomputer in accordance with the present invention.

Referring to FIG. 7, the microcomputer 72 is programmed to perform the following generally designated logic function routines of Idle Scan 110, Start-Up 150, Conveyor Start-Up 200, Monitor 260, Scheduler 350, Recovery 400 and Shut-Down 450. Upon Power Up 100, an Initialization Routine is performed for program variables. During the Idle Scan Routine 110, the keyboard or other auxiliary inputs 74 are scanned and any directed command functions are performed, the panel display 76 is updated. During the Start-Up Routine 150, the conveyor system 20 is accelerated to a set input speed and the shutter bar 38 is moved to its start up position also all flags are appropriately initialized. The Monitor Routine 200 generally updates sensors inputs; detects and processes letter lead and trailing edge data; monitors the trip sensor for the setting of the wait trip flag and a wait slow down flag in addition to initializing delay counters. Also, during the Monitor Routine, mailpiece input speeds are measured and appropriate cycle print speeds are determined.

The Scheduler 350 performs a scheduling process to properly sequence the order of events based upon the mode of operation of the mailing machine, that is, slowing down or speeding up the mailpiece and activates them. The Scheduler also detects some system error conditions such as mail jam and sets stop flag accordingly.

The Recovery Routine 400 is entered only upon the existence of a shutdown condition, the Recovery Routine 400 attempts to adjust and restore operations within a critical time. Presuming the Recovery Routine 400 has not been able to do this the Shut-down Routine 474 shuts down the system after the present meter trip is completed. A detailed description of the logic within the routines are forthcoming.

Upon applying power to the microcomputer, the system is initialized and the main routine proceeds to execute a Idle Scan Routine 110.

Idle Scan

Figure 8:
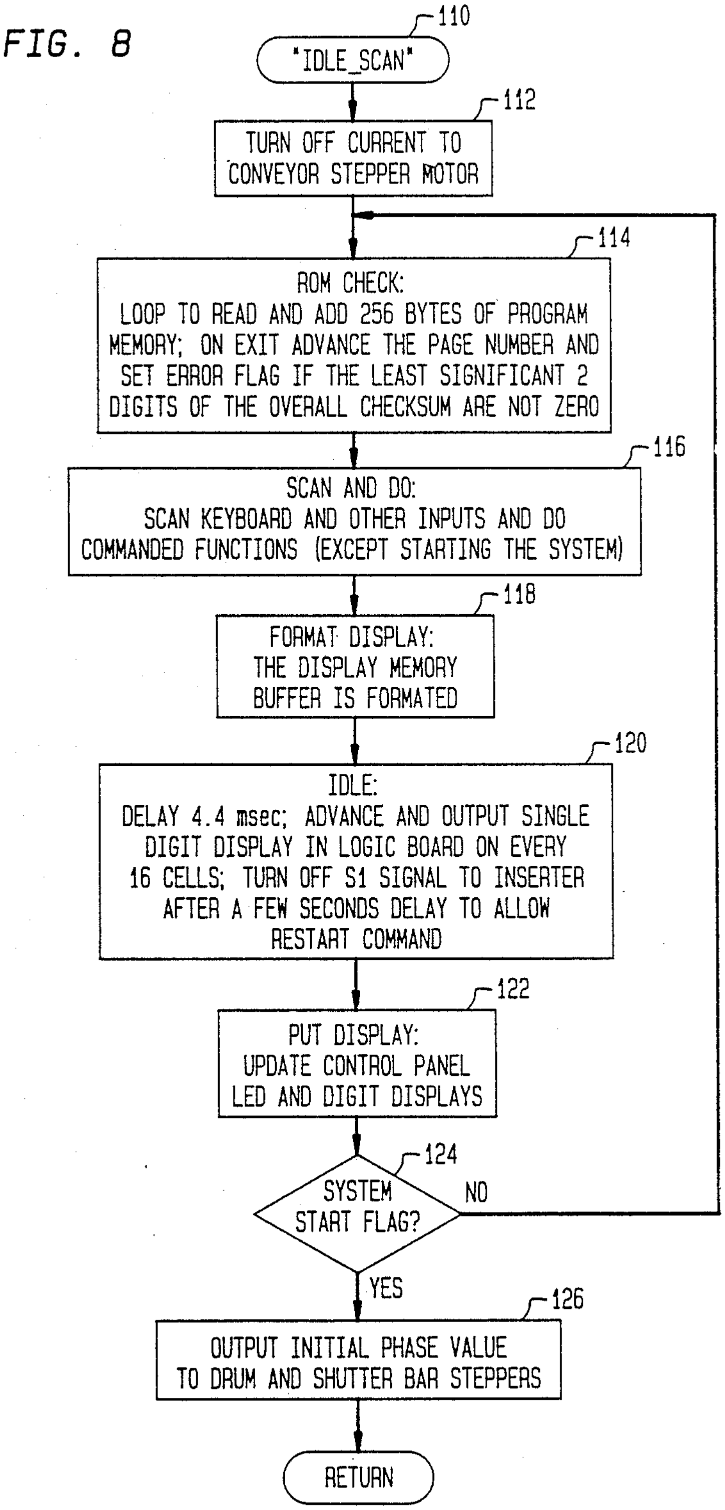
FIG. 8 represents a flow chart representation of the Idle Scan subroutine of the program logic.

Referring to FIG. 8, upon entry into the Idle Scan Routine 110 all current to conveyor motor 24 is turned off at logic block 112. The routine proceeds to logic 114 where upon ROM Check Routine is executed. The ROM check routine calls upon a program byte sum to be performed from ROM memory and other ROM Checks are performed. Also, system error flags are set if the final sum is not consistent. The routine proceeds to execute a Scan And Do Routine at logic block 116 whereupon the system stand ready to read and execute inputs commands from external input devices such as an external Keyboard 74 with the exception of a system start-up command. The routine then proceeds to execute a Format Display Routine at logic block 118 in which the display memory buffer is formatted. The routine proceeds to logic block 120 whereupon an Idle Routine is executed. The Idle Routine functions to provides a 4.4 millisecond system delay allowing sufficient time for a restart routine to be executed when the appropriate error flag has been set during execution of the ROM check Routine or at some subsequent point in main Routine loop. The system then executes a Put-Display Routine at logic block 122 whereupon any system errors or the batch count are displayed on the mailing machine display 74. The routine proceeds to decision block 124 whereupon a check is performed to check if a valid start command is present based upon operator or host inserter signal setting. If a valid start command does not exist the routine is looped to logic 114; if a valid start command is present the routine progresses to set initial phase value for the drum and shutter bar stepper motors 48 and 56, respectively at logic block 126. The routine then returns to the main routine at 130.

Start-Up

Figure 9:
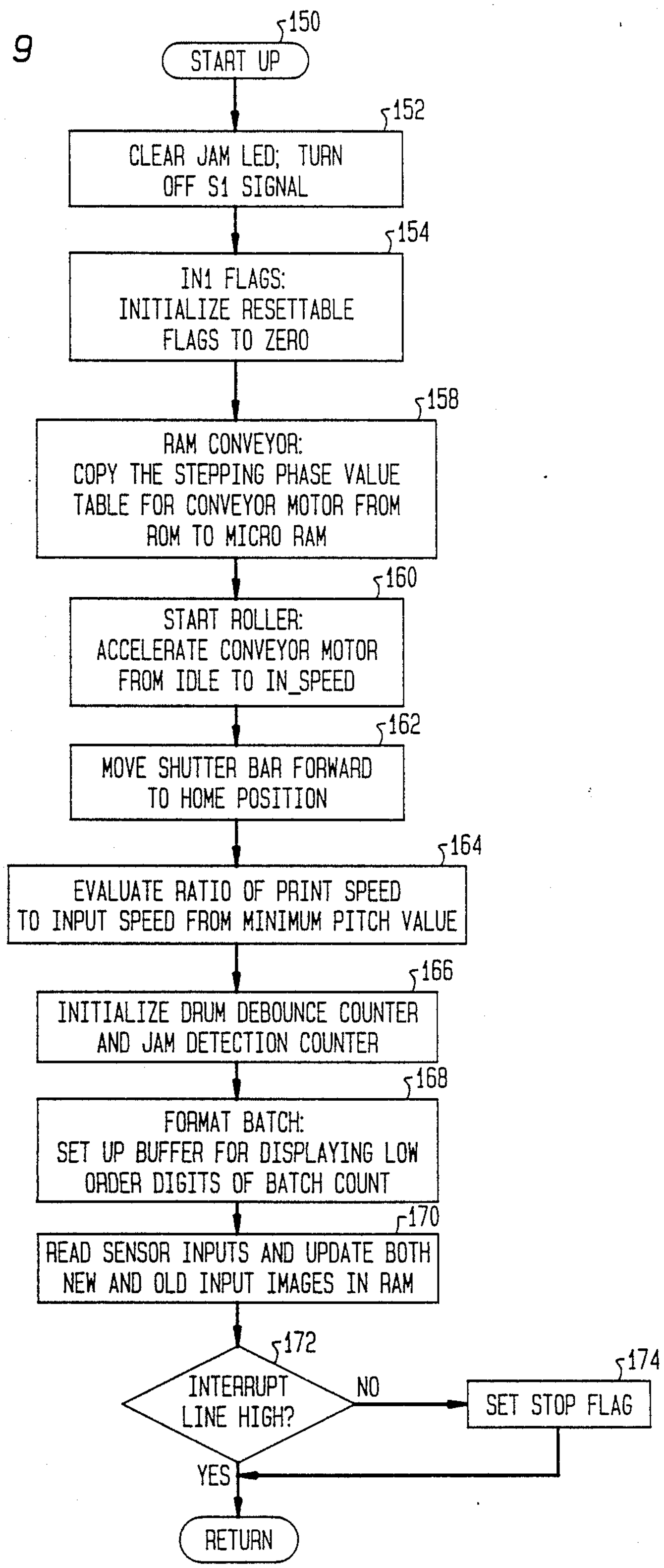
FIG. 9 illustrates a flow chart representation of the Start Up subroutine of the program logic.

Referring to FIG. 9, the main routine then proceeds to execute a Start-Up Routine at logic block 150. The mailing machine display 76 is now cleared at logic block 152 of any malfunction indicator such as jam indicator and inserter 14 communication line "S1" is turned "OFF" which signals the inserter that the mailing machine is in a ready state. The routine then proceeds to logic block 154 whereupon the routine INI-FLAGS are executed to cause the flags to be initialized and reset to zero. The routine proceeds to logic block 158 whereupon a RAM Conveyor routine is executed to cause the conveyor stepper motor 24 phase value table to be copied from ROM to the microcomputer RAM. The routine proceeds from logic block 158 to logic block 160 and executes a Start Roller Routine whereupon the conveyor stepper motor 24 is accelerated from an idle to predetermined speed "IN-SPEED". The routine proceeds from logic block 160 to logic block 162 whereupon the shutter bar stepper motor 56 is actuated to effect a shift of the shutter bar 44 to the home position. The routine then proceeds to logic block 164 whereupon the Peak Drum Speed is determined by:

$$\text{PEAK DRUM SPEED} = \frac{\text{Absolute Pitch Distance}}{\text{Pitch Setting Value}} \times \text{IN-SPEED}$$

The routine then proceeds to initialize the drum position recheck counter, referred to as drum debounce counter, and the jam detection counter at logic block 166. The routine then proceeds to execute a Format Batch Routine at logic block 168 in which a buffer display for the batch count, e.g., number of mailpieces processed, is formatted. Sensors 66, 68 and 70 inputs are then read and updated in RAM at logic block 170. The routine then checks to identify if an Interrupt Signal has been received as a result of failure of any of the stepper motors or if the machine cover is open at logic block 172. If an Interrupt Signal has not been received, the routine is exited to the main routine at logic block 176. If an Interrupt Signal has been received the stop flag is set at logic block 174 and the routine is exited to the main routine at logic block 176.

Monitor

Figure 10A:
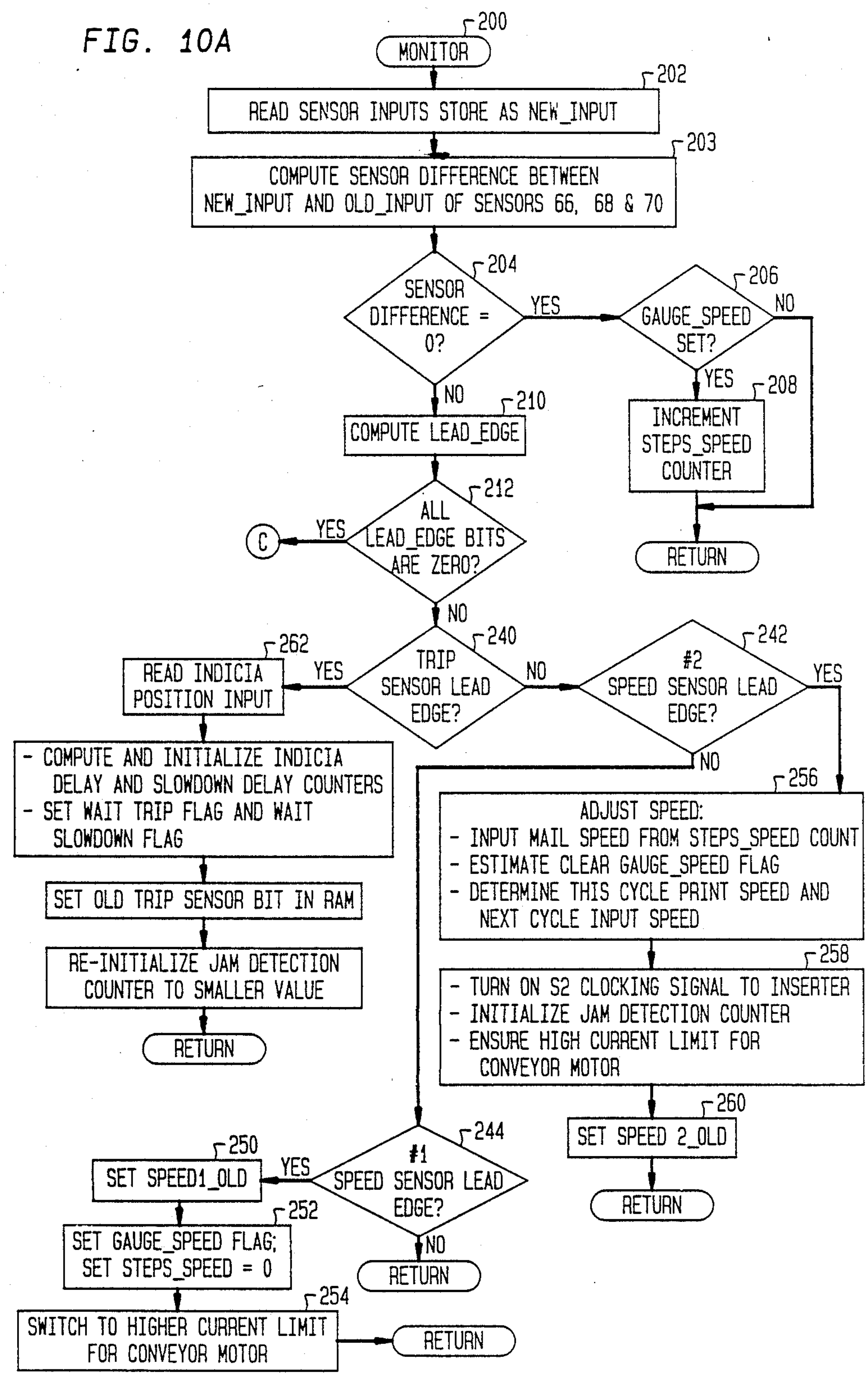
FIGS. 10 and 10B represent the microcomputer program logic for the Monitor subroutine of the program logic.
Figure 10B:
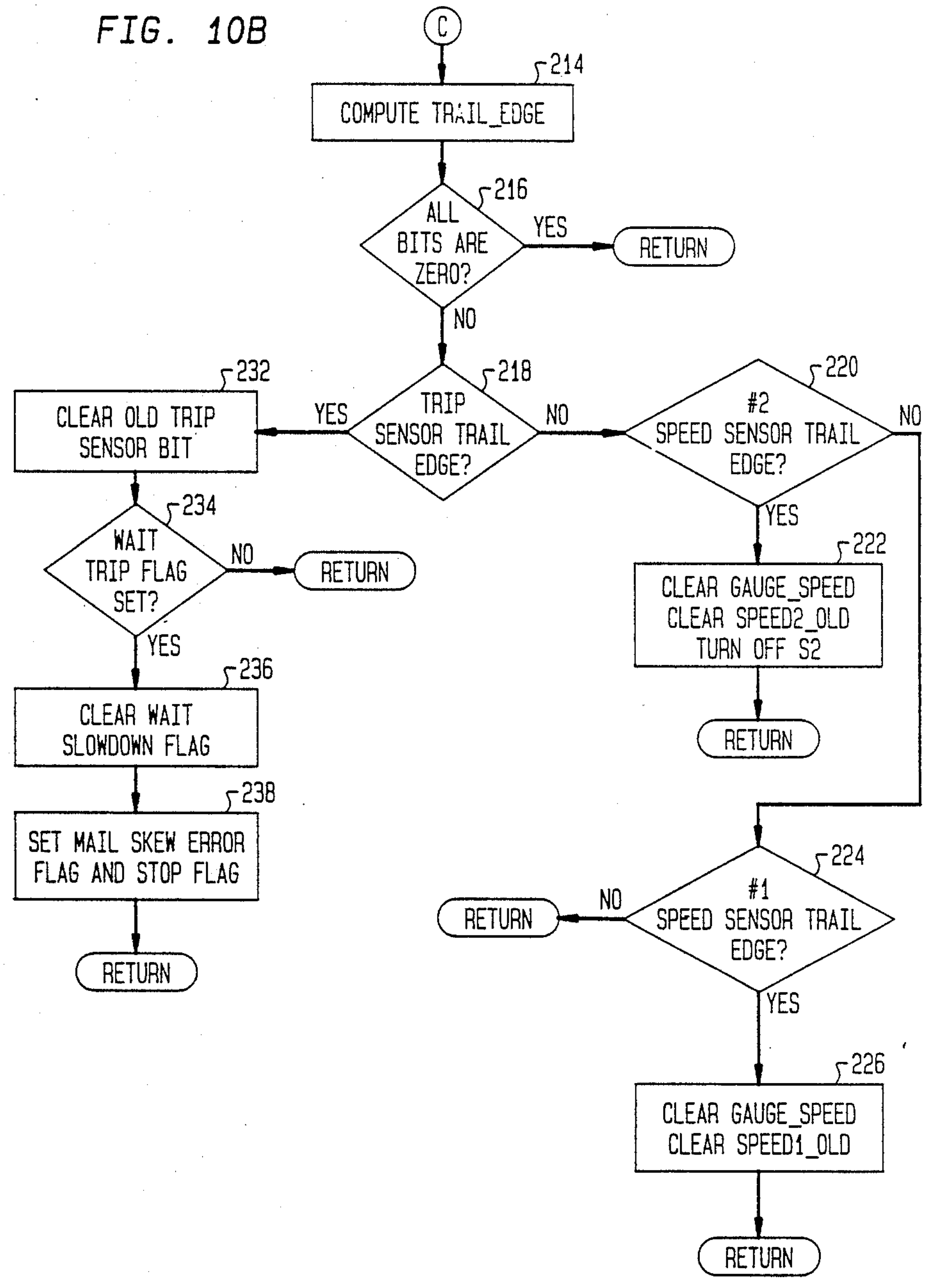

Referring to FIGS. 10A and 10B, the main routine process to the Monitor routine at logic block 200. Upon routine entry, a read of the sensors 60, 62, 66, 68 and 70 is performed. The read information is stored as NEW-INPUTS at logic block 202. The routine then proceeds to logic block 203 whereupon binary difference between NEW-INPUTS and OLD-INPUTS of sensors 66, 68 and 70 is determined. The routine then encounters decision block 204 whereupon the new sensor inputs (NEW-INPUTS) are compared with the old sensor inputs (OLD-INPUTS) of sensors 66, 68 and 70; if the inputs are equal, the routine proceeds to decision block 206 whereupon a check is performed to determine if the Gauge-Speed flag (GS) is set (this flag is set of the letter's lead edge 15 is between the 2 speed sensor); If the Gauge-Speed flag is set the routine proceeds to increment the Step-Speed Count at logic block 208. The routine is then returned to the main routine at 348. If the Gauge-Speed flag is not set the routine is directly returned to the main routine at 348.

If at decision block 204, the NEW-INPUTS are not equal to the OLD-INPUTS which indicated that either the leading edge or trailing of the mailpiece has traversed speed sensors 66 and 68 or trip sensor 70. The routine proceeds to logic block 210 whereupon the variable LEAD-EDGE is computed. The bit LEAD EDGE information is obtained by masking sensor difference with NEW INPUT. The routine now proceeds to decision block 212 whereupon a checked sensor LEAD-EDGE bit information is performed. Referring to 212, if all LEAD-EDGE bits are zero, the routine proceeds to logic block 214 and compute the TRAIL-EDGE bit by masking the sensor difference with the OLD-INPUT. The routine then proceeds to decision block 216 whereupon a check of the TRAIL-EDGE bit is performed; if the bit information is all zero, the routine returns to the main routine at 348. If any bit information is non-zero the routine proceeds to decision block 218 whereupon a check is performed to ascertain whether the trip sensor TRAIL-EDGE bit is set; if the trip sensor TRAIL-EDGE bit is not set, the routine proceeds to decision block 220. At decision block 220, it is determined whether the second speed sensor 68 TRAIL-EDGE bit is set; if the second speed sensor 68 TRAIL-EDGE bit is set, the routine proceeds to logic block 222. At logic block 222, the bit information GAUGE-SPEED and the SPEED2-OLD are cleared and the S2 signal to the inserter is turned off which indicates to the inserter 14 to send the next envelope. The routine is then returned to the main routine at 348.

Referring to decision block 220, if at this time the second speed sensor TRAIL-EDGE bit is not set, the routine proceeds to decision block 224 whereupon it is determined whether the first speed sensor TRAIL-EDGE bit has been set. If the first speed sensor TRAIL-EDGE bit has been set, the routine proceeds to logic block 226. At logic block 226, bits GAUGE-SPEED and SPEED1-OLD are cleared and the routine is returned to the main routine at 348. If the first speed sensor TRAIL-EDGE bit has not been set, the routine is then returned to the main routine at 348.

If at decision block 218 the trip sensor TRAIL-EDGE bit is set, the routine proceeds to logic block 232 whereupon the trip sensor bit is cleared in the OLD-INPUT byte. The routine then proceeds to decision block 234 whereupon it is determined whether the WAIT-TRIP flag has been set. If the WAIT-TRIP flag has not been set the routine is returned to the main routine at junction 348. If the WAIT-TRIP flag has been set the routine proceeds to logic block 236 whereupon the WAIT-SLOWDOWN flag is cleared. The routine then proceeds to logic block 238 whereupon the MAIL SKEW ERROR and the STOP flags are set subsequent to which the routine is returned to the main routine at junction 348.

Referring to decision block 212 if any of the LEAD-EDGE bit information is non-zero the routine proceeds to decision block 240. At decision block 240, it is determined whether the trip sensor 71 LEAD-EDGE bit is set. If the trip sensor 71 LEAD-EDGE bit is not set, the routine proceeds to decision block 242. At decision block 242, it is determined whether the speed sensor 68 LEAD-EDGE bit is set; if the speed sensor 68 LEAD-EDGE bit has not been set, the routine proceeds to decision block 244 whereupon it is determined whether the speed sensor 68 LEAD-EDGE bit is set. If at this time, the first sensor LEAD-EDGE bit has not been set, the routine proceeds to the main routine at junction 348.

Referring to decision block 244, if the speed sensor 66 LEAD-EDGE bit is set, the routine proceeds to logic blocks 250, 252 and 254 sequentially whereupon the following function are respective performed (i) update first speed sensor bit in OLD-INPUT bit, i.e., set SPEED1-OLD, (ii) the GAUGE-SPEED flag is set and the STEP-SPEED is set to zero and (iii) the current to the conveyor stepper motor 24 is switch high. The routine now returns to the main routine at junction 348.

Referring to decision block 242, if the speed sensor 68 LEAD-EDGE bit is set, the routine proceeds to logic block 256. At logic block 256 an ADJUST SPEED Routine is performed. The ADJUST SPEED Routine performs the following functions: (i) estimates input mail speed from STEP-SPEED count, (ii) clear GAUGE-SPEED flag and (iii) determine this cycle's PRINT-SPEED (Peak Drum Speed) and next cycle INPUT-SPEED. The routine then proceeds to logic block 258 whereupon the following functions are performed: (i) the "S2" signal to the inserter 14 is turned "ON" notifying the inserter of the arrival of the mailpiece in mailing machine, (ii) the jam detection counter (not shown) is initialized and (iii) turn "ON" high current if mail missed speed sensor 66 due to skewing. The routine now proceeds to logic block 260 whereupon (SPEED2-OLD) the routine is returned to the main routine at 348.

Referring to decision block 240, if the trip sensor LEAD-EDGE bit is set, the routine proceeds to logic block 262 whereupon a read function is performed of the desired indicia position input which may be an auxiliary input 74. The routine now proceeds to logic block 264 whereupon the following functions are performed: (i) the INDICIA-DELAY is computed and initialized, (ii) the SLOWDOWN-DELAY is computed and the slowdown delay counter is initialized and (iii) WAIT-TRIP and WAIT SLOWDOWN flags are set. These functions are performed relative to the indicia position read at 262. The routine then proceeds to logic block 266 whereupon the OLD-TRIP-SENSOR is set in the OLD-INPUT bit. The routine now proceed to logic block 268 whereupon the JAM-DETECTION counter is reinitialized to the smaller value and the routine is returned to the main routine at 348.

Scheduler

Figure 11A:
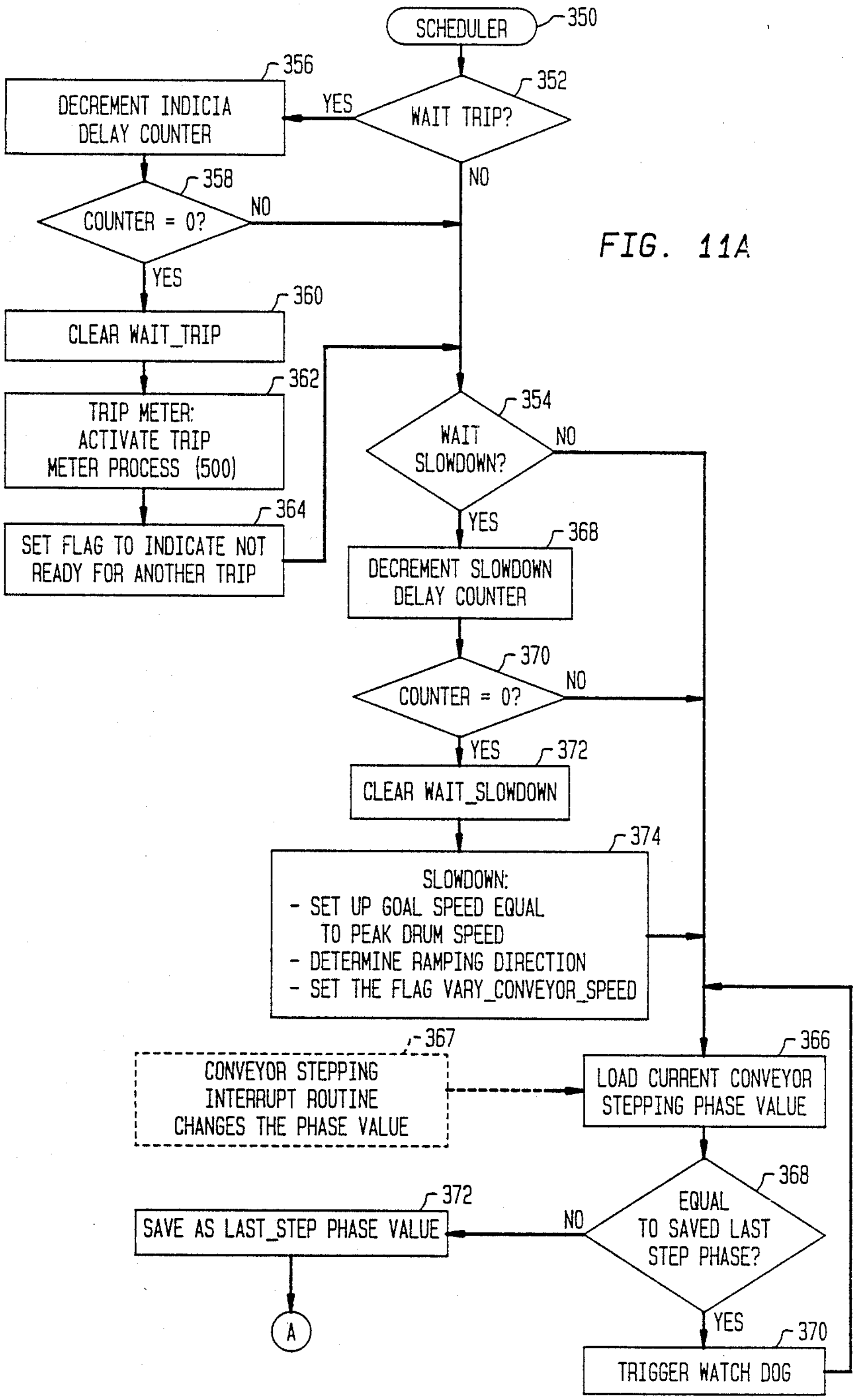
FIGS. 11A and 11B represents the flow chart for the Scheduler subroutine of the microcomputer program logic.
Figure 11B:
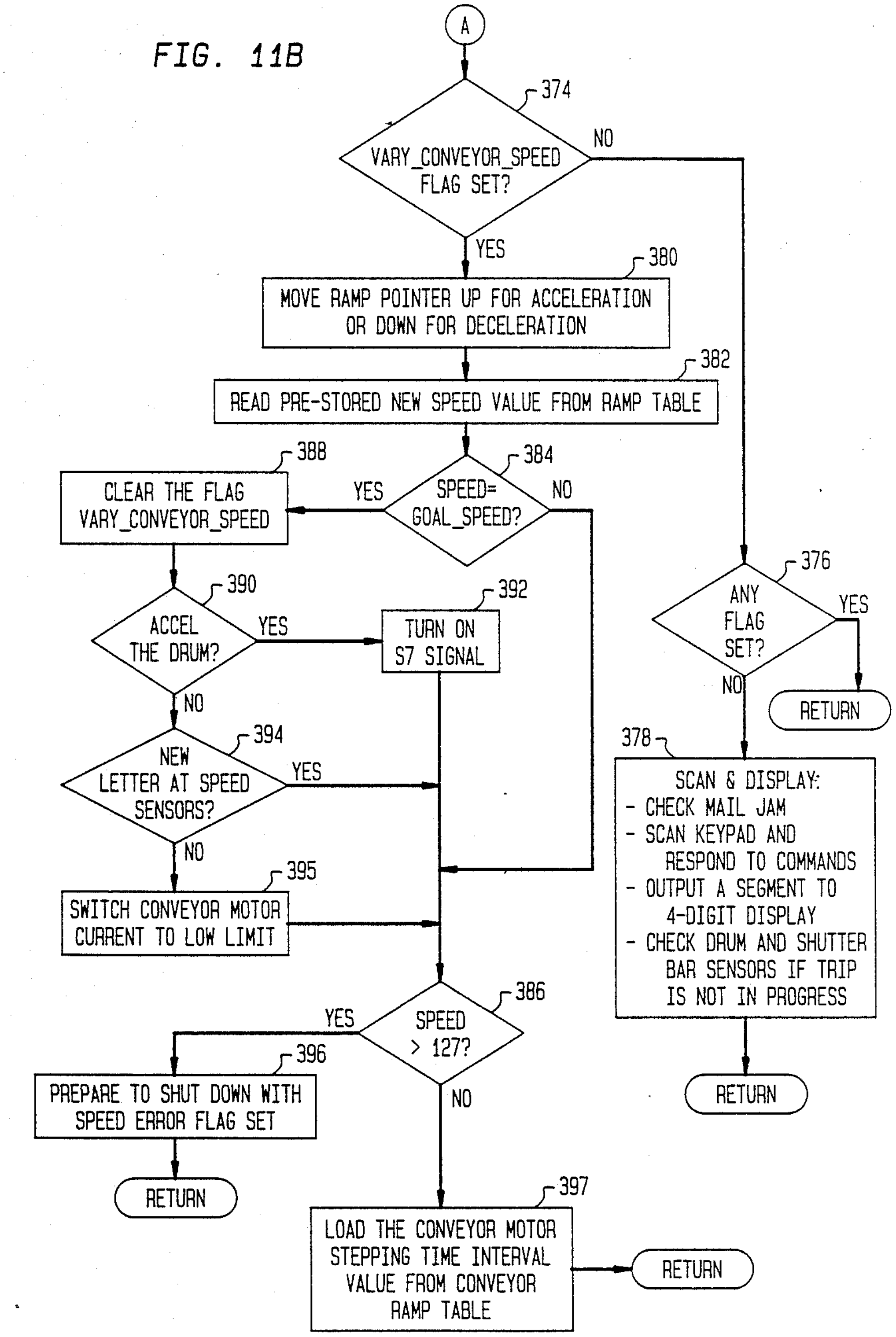

Referring to FIGS. 11A and 11B, the main routine from junction 348 enters the Scheduler routine at logic block 350. Upon entry the Scheduler Routine, decision block 352 performs a check to ascertain whether the WAIT-TRIP flag has been set. If the WAIT-TRIP flag has not been set the routine proceeds to decision block 354. If the WAIT-TRIP flag has been set the routine proceeds to logic block 356 whereupon the indicia delay counter is decremented. The routine proceeds from logic block 356 to decision block 358 whereupon the indicia delay counter is check. If the indicia delay counter is not equal to zero, the routine proceeds to decision block 354. If the indicia delay counter is equal to zero, the routine proceeds sequentially to logic blocks 360, 362 and 364 whereupon the respective functions are performed: (i) the WAIT-TRIP flag is cleared, (ii) the trip meter process routine (TRIP METER 500 illustrated in FIGS. 13A and 13B and more fully described subsequently) is executed and (iii) appropriate flags are set to indicate not-ready for another trip. From logic block 364 the routine proceeds to decision block 354.

At decision block 354, the WAIT-SLOWDOWN flag is checked to ascertain if the flag is set. If the WAIT-SLOWDOWN flag is not set, the routine proceeds to logic block 366. If the WAIT-SLOWDOWN flag is set the routine proceeds to logic block 368. At logic block 368, the slowdown delay counter is decremented and the routine proceeds to decision block 370. A check is performed at decision block 370 as to whether the slowdown delay counter is equal to zero; if the slowdown delay counter is not equal to zero the routine proceeds to logic block 366. If the slowdown delay counter is equal to zero the routine proceeds sequentially to logic blocks 372 and 374 whereupon the respective functions are performed: (i) the WAIT-SLOWDOWN flag is cleared and (ii) the conveyor stepper motor GOAL-SPEED is set equal to desired peak drum speed, the speed ramping direction is determined and the VARY-CONVEYOR-SPEED flag is set. From logic block 374, the routine proceeds to logic block 366.

At logic blocks 366 and 368, the conveyor stepping phase value is loaded and compared with the last step phase value saved in the previous call. If the phase values are equal, the routine proceeds to logic block 370 whereupon the watch dog circuit is triggered with a pulse to prevent microprocessor reset and subsequently the routine loops to logic block 366. As indicated at logic block 367, the conveyor stepping interrupt routine working in the background will change the current stepping phase value, so if the phase values become unequal and the routine proceeds to logic block 372 whereupon the LAST-STEP phase value is updated.

From logic block 372, the routine proceeds to decision clock 374 whereupon a check is performed to ascertain whether the VARY-CONVEYOR-SPEED flag has been set. If the VARY-CONVEYOR-SPEED has not been set, the routine proceeds to decision block 376. At decision block 376 a check is performed to ascertain whether any flag associated with time initial tasks has been set; if the flags are set, the routine returns to the main routine at 398. If no flags are set, the routine proceeds to logic block 378 whereupon a SCAN & DISPLAY routine is executed to perform the following functions: (i) check mail jam; (ii) scan key-pad and respond to commands; (iii) output a segment to display; (iv) check drum and shutter bar sensors if trip is not in process. Subsequent to logic block 378, the routine returns to the main routine at 398.

Referring to decision block 374, if the CONVEYOR-SPEED flag has been set, the routine proceeds to logic block 380 whereupon the ramp pointer is moved up for acceleration or down for deceleration. The routine now proceeds to logic block 382 whereupon a read of the pre-stored NEW-SPEED value from the a ramp table is performed. The routine now proceeds to decision block 384 to ascertain whether the NEW-SPEED equals GOAL-SPEED, if not the routine proceeds to decision block 386. If the speeds are equal the routine proceeds to logic block 388 whereupon the VARY-CONVEYOR-SPEED flag is cleared. From logic block 388, the routine proceeds to decision block 390 whereupon a check is performed to ascertain whether the print drum stepper motor 48 is accelerating. If the stepper motor 48 is accelerating the routine proceeds to logic block 392 whereupon the "S7" signal to the inserter is turned "ON". From decision block 392 the routine proceeds to decision block 386.

Referring to decision block 390, should the print drum stepper motor 48 not be accelerating the routine proceeds to decision block 394 whereupon a check is performed to ascertain whether a new letter is at speed sensors 66 or 68. If a new letter is present at either of the speed sensors, the routine proceeds to decision block 386. If no new letter is present at the speed sensors 66 or 68, the routine proceeds to logic block 395 whereupon the conveyor motor current is switch to "LOW" and the routine proceeds to decision block 386.

At decision block 386, a check is performed to ascertain whether the SPEED is greater than 127 inches per second. If the SPEED exceeds 127 inches per second the routine proceeds to logic block 396 whereupon the system is prepared to be shut down with speed error flag set and the routine is returned to the main routine at 398. If the SPEED is less than or equal to 127 inches per second, the routine proceeds to 397 where the conveyor motor stepping time interval from conveyor ramp table is loaded and the routine is returned to the main routine at 398.

Main Routine Re-Entry At 398

Referring to FIG. 7, subsequent to main routine reentry at 398, a main routine decision block 399 is encountered whereupon a check is performed to ascertain whether the stop flag has been set. If the stop flag has not been set the main routine returns to junction 176 and repeats the processes of monitoring and scheduling. If the stop flag has been set the main routine enters the recovery routine 400.

Recovery

Figure 12A:
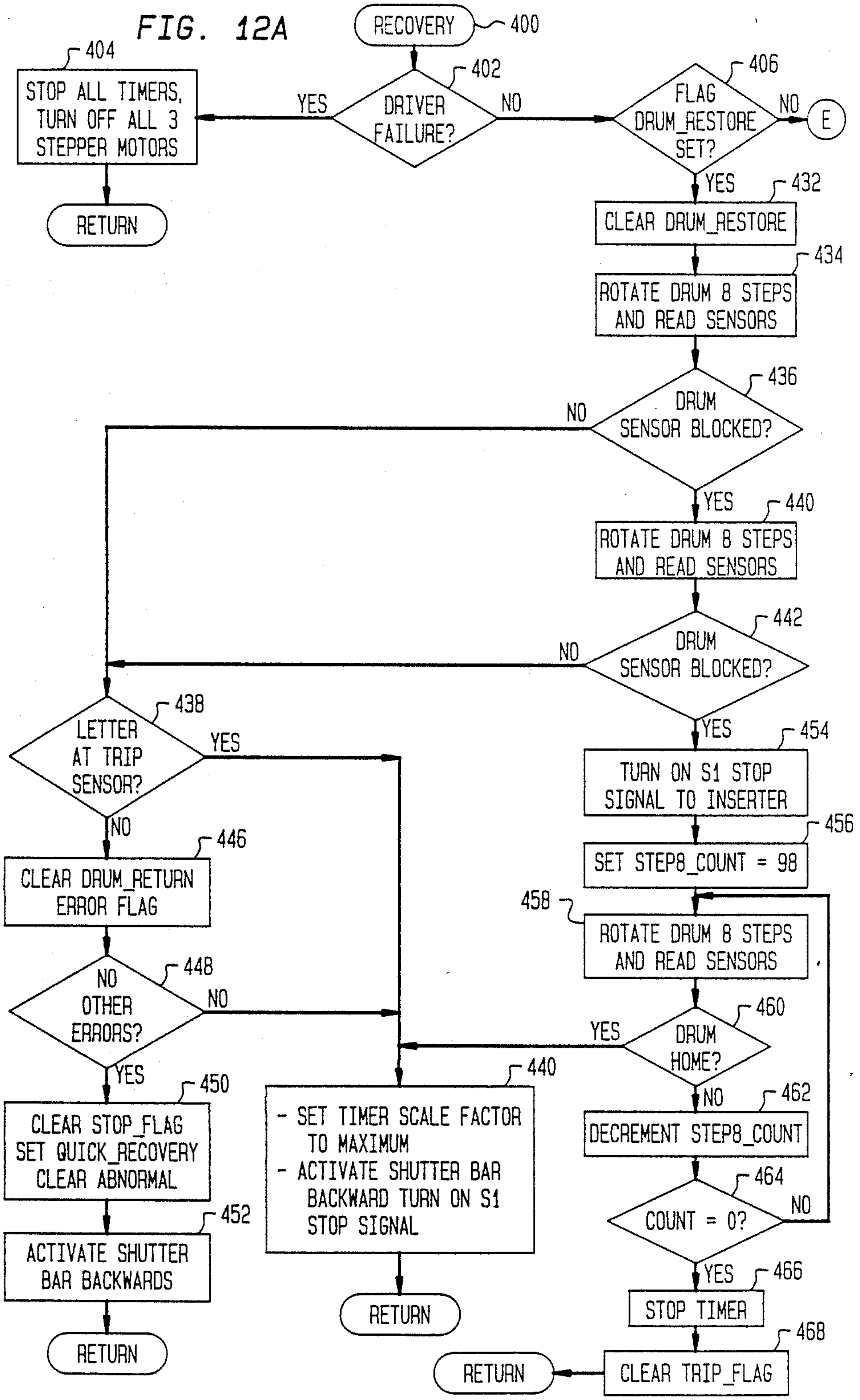
FIGS. 12A and 12B represents the flow chart for the Recovery subroutine of the microcomputer program logic.
Figure 12B:
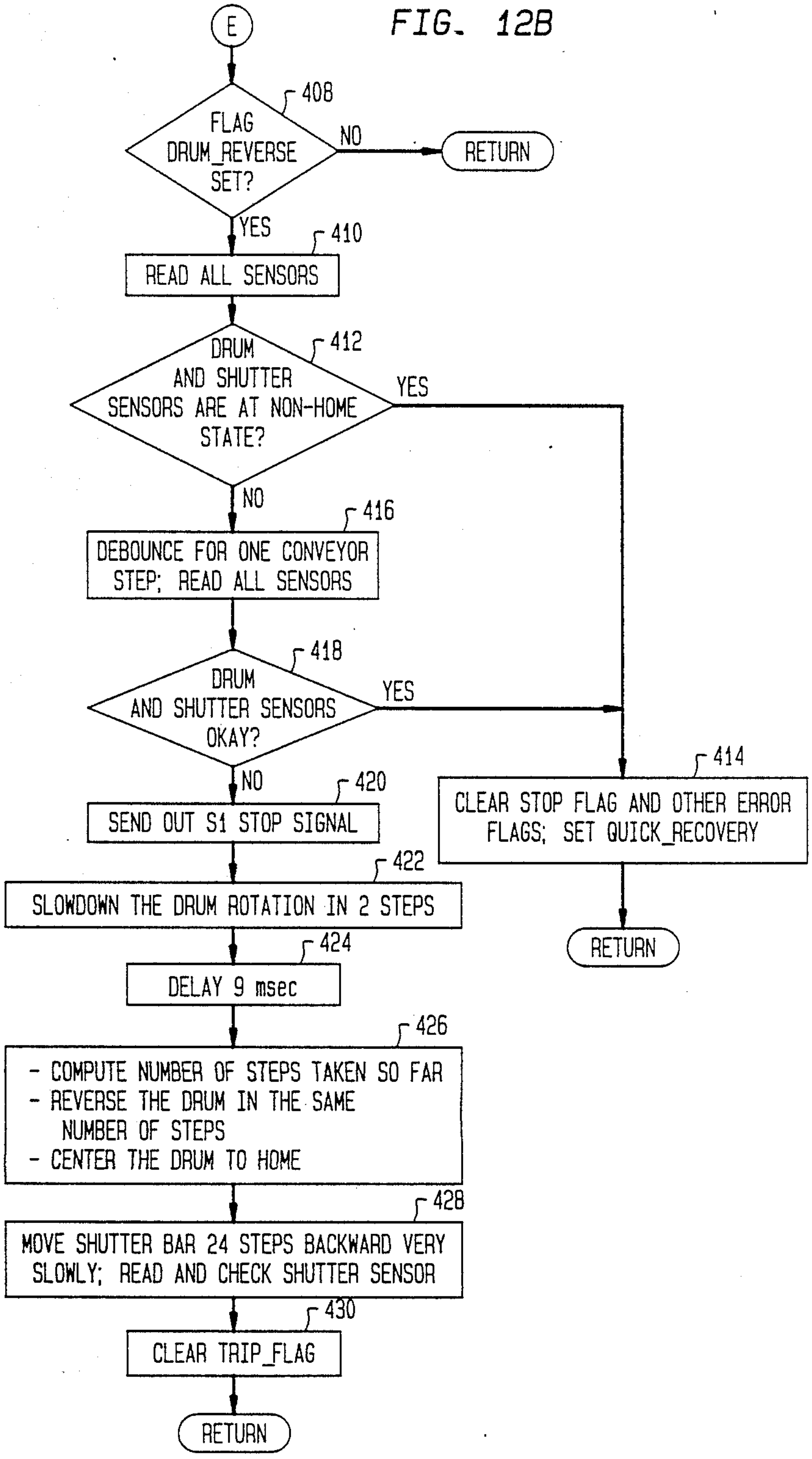

Referring to FIGS. 12A and 12B, upon entering the recovery routine a decision block 402 is encountered whereupon a check is performed to ascertain if a driver failure has occurred, that is, whether any interrupt signal has been received from the driver circuits 78, 80 and 82. If a driver failure has occurred the routine proceeds to logic block 404 whereupon all timers 0, 1 and 2 are stopped and all stepper motors 24, 48 and 56 are turned "OFF". Subsequent to logic block 404 the routine returns to the main routine at 470. If no driver failure has occurred the routine proceeds to decision block 406. At this point, a self correct or recovery is subsequently attempted.

At decision block 406 a check of the DRUM-RESTORE flag is performed. If the DRUM-RESTORE flag is not set the routine proceeds to decision block 408 whereupon a check of the DRUM-REVERSE flag is performed. If the DRUM-REVERSE flag is not set the routine returns to the main routine at 470. If the DRUM-REVERSE flag is set, the routine proceeds to logic block 410 whereupon all sensors states 60, 62, 66, 68 and 71 are read. From logic block 410, the routine proceeds to decision 412 whereupon a check is performed to ascertain whether both the drum and shutter bar sensor have undergone valid change from the home state. If both the drum sensor 62 and the shutter bar sensor 60 are not in the home state, the routine proceeds to logic block 414. If either the drum sensor 62 or the shutter bar sensor 60 is at home, the routine proceeds to logic block 416 whereupon the system is debounced for one conveyor step and the status of all sensors are again read. From logic block 416 the routine proceeds to decision block 418 whereupon the previous check at 412 is repeated. If the checkups are positive, the routine proceeds to logic block 414 whereupon (i) the stop flag and other error flags are cleared and (ii) the QUICK-RECOVERY flag is set. Subsequent to logic block 414, the routine is returned to the main routine at 470.

Referring to decision block 418, if the check is negative the routine proceeds sequentially to logic blocks 420, 422, 424, 426, 428 and 430 whereupon the following respective functions are performed:

(i) slowdown the drum rotation in 2 steps
(ii) delay 9 msec
(iii) compute number of drum and stepper motor steps taken and reverse the drum stepper motor an equal number of steps, center the drum 32 to home position
(iv) move shutter bar stepper motor 56 twenty four (24) steps backward slowly then read and check shutter bar sensor
(v) clear TRIP-FLAG.

From logic block 430, the routine returns to the main routine at 470.

Referring to decision block 406, if the DRUM-RESTORE flag is set the routine proceeds sequentially to logic blocks 432 and 434 whereupon the respective function are performed (i) clear DRUM-RESTORE flag and (ii) rotate drum stepper motor 48 eight (8) steps and read drum and shutter bar sensors 62 and 60. From logic block 434 the routine proceeds to decision block 436 whereupon a check is performed to ascertain whether the drum sensor 62 is blocked; if the drum sensor 62 is not blocked, the routine proceeds to decision block 438. If the drum sensor is blocked the routine proceeds to logic block 440 whereupon the drum is rotated 8 more steps and the drum and shutter bar sensors 62 and 60, respectively, are again read. From logic block 440, the routine proceeds to decision block 442 whereupon a check is again performed to ascertain whether the drum sensor 62 is blocked. If the drum sensor 62 is not blocked the routine proceeds to decision block 438.

At decision block 438 a check is performed to ascertain whether a letter is at the trip sensor 70; if a letter is at the trip sensor 70, the routine proceeds to logic block 444. At logic block 444 the following function are performed (i) set timing scale factor to maximum, (ii) activate shutter bar backward movement process and (iii) turn on the "S1" stop signal to inserter. Subsequent to logic block 444 the routine is returned to the main routine at 470.

Referring to decision block 438, if no letter appears at trip sensor 70, the routine proceeds to logic block 446 whereupon the DRUM-RETURN error flag is cleared. The routine proceeds to decision block 448 whereupon a check is performed to ascertain whether there are any other error flags set. If other error flags are set the routine proceeds to logic block 444 afore noted and therefrom to the main routine at 470. If there are no other error flags set, the routine sequentially proceeds to logic blocks 450 and 452, whereupon the respective functions of (i) clear STOP-FLAG, set QUICK-RECOVERY flag and clear ABNORMAL flag, and (ii) activate shutter bar backward movement process are performed. Subsequent to logic block 452, the routine returns to the main routine at 470.

Referring to logic block 442, if the drum sensors is blocked, the routine proceeds sequentially to logic blocks 454, 456 and 458 whereupon the respective functions are performed: (i) "S1" stop signal to the inserter is turned "ON", (ii) set STEP8-COUNT to 98 and (iii) rotate drum stepper motor 56 eight (8) steps and read drum and shutter bar sensor 62 and 60, respectively. From logic block 458, the routine proceeds to decision block 460 whereupon a check is perform of the drum sensor 62 to ascertain whether the drum 32 is in the home position. If the drum 32 is in the home position the routine proceeds to the afore noted logic block 444 and therefrom returns to the main routine at 470. If the drum 32 is not in the home position the routine proceeds to logic block 462 whereupon the STEP8-COUNT is decremented. From logic block 462, the routine proceeds to decision block 464 whereupon a check of the STEP8-COUNT is performed. If the STEP8-COUNT is not equal to zero, the routine returns to logic block 458. If the STEP8-COUNT is equal to zero, the routine proceeds to sequentially logic block 466 and 468 whereupon the following respective functions are performed (i) timer "1" is stopped and (ii) the TRIP-FLAG is cleared. From logic block 468 the routine is returned to the main routine at 470.

Quick Recovery

Referring to FIG. 6, upon return to the main routine at 470, the main routine proceeds to decision block 472. At decision block 472, a check is performed to ascertain whether the QUICK-RECOVERY flag is set. If the QUICK-RECOVERY flag has been set, the main routine returns to junction 176 and proceeds as aforedescribed therefrom. If the QUICK-RECOVERY flag has not been set, the routine proceeds to the SHUTDOWN routine 474.

Shutdown

Figure 13:
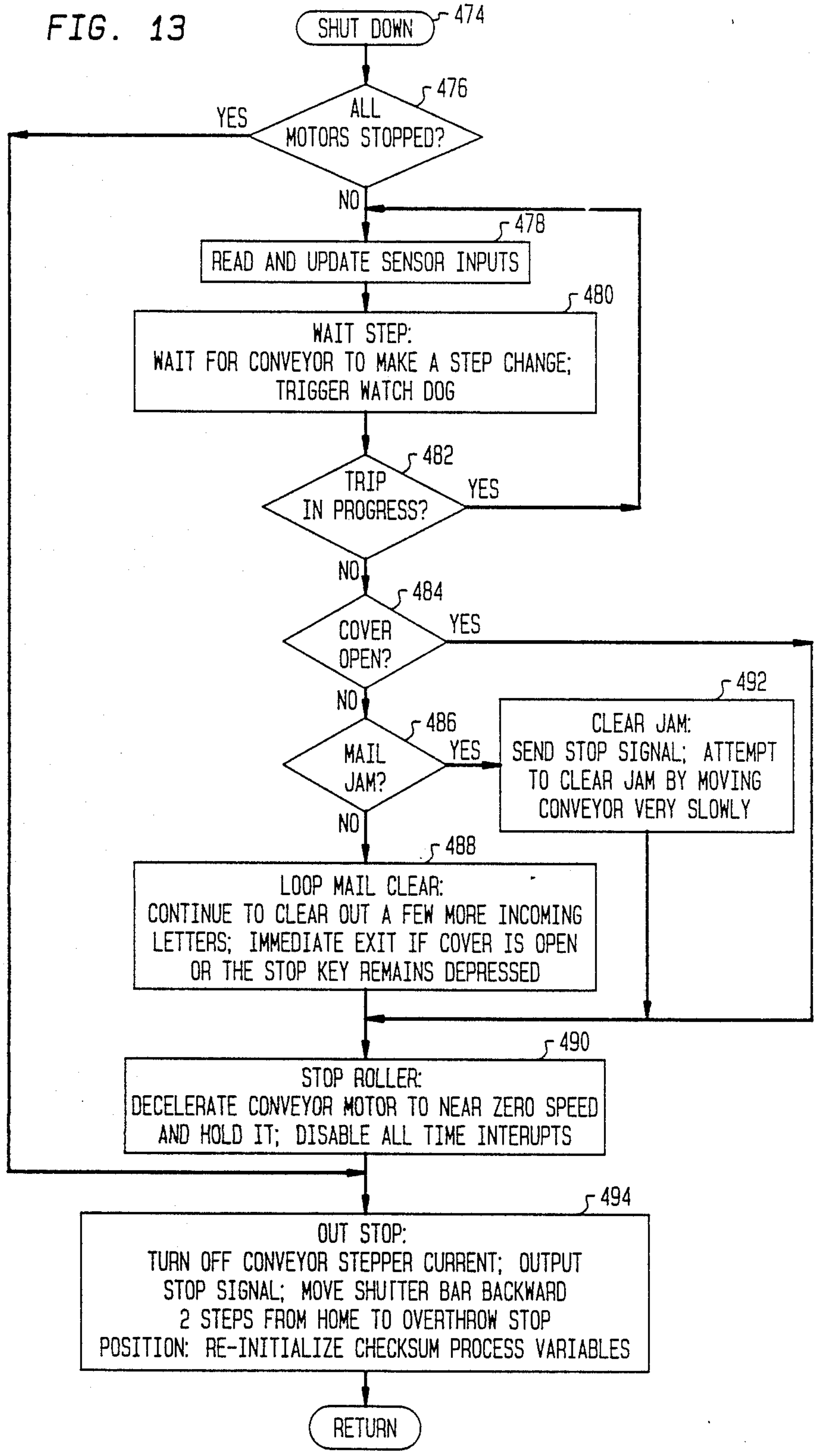
FIG. 13 represents the flow chart for the Shutdown subroutine of the microcomputer program logic.
Figure 14A:
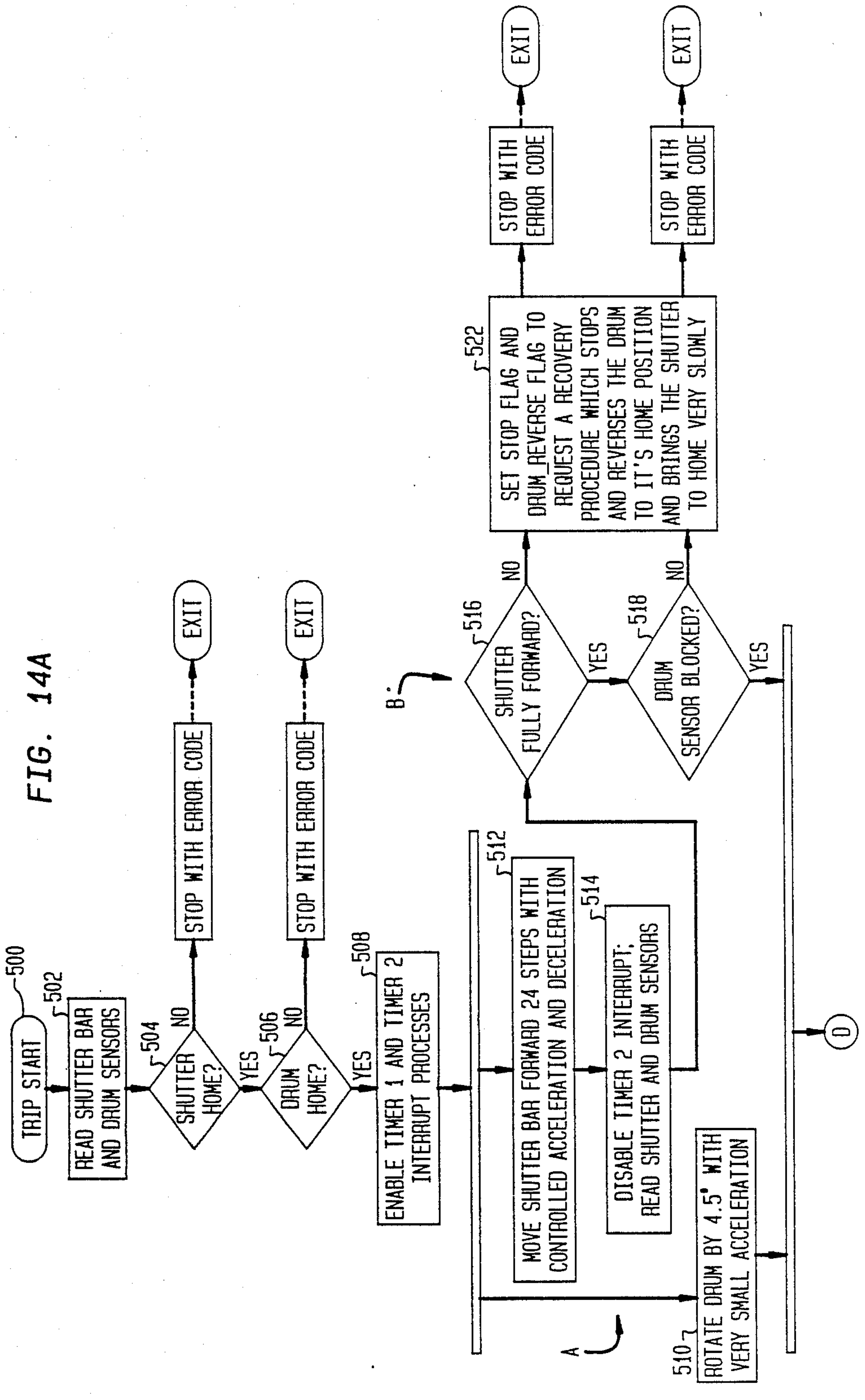
FIG. 14A and 14B represents a logic diagram for processing a meter trip in accordance with the present invention.
Figure 14B:
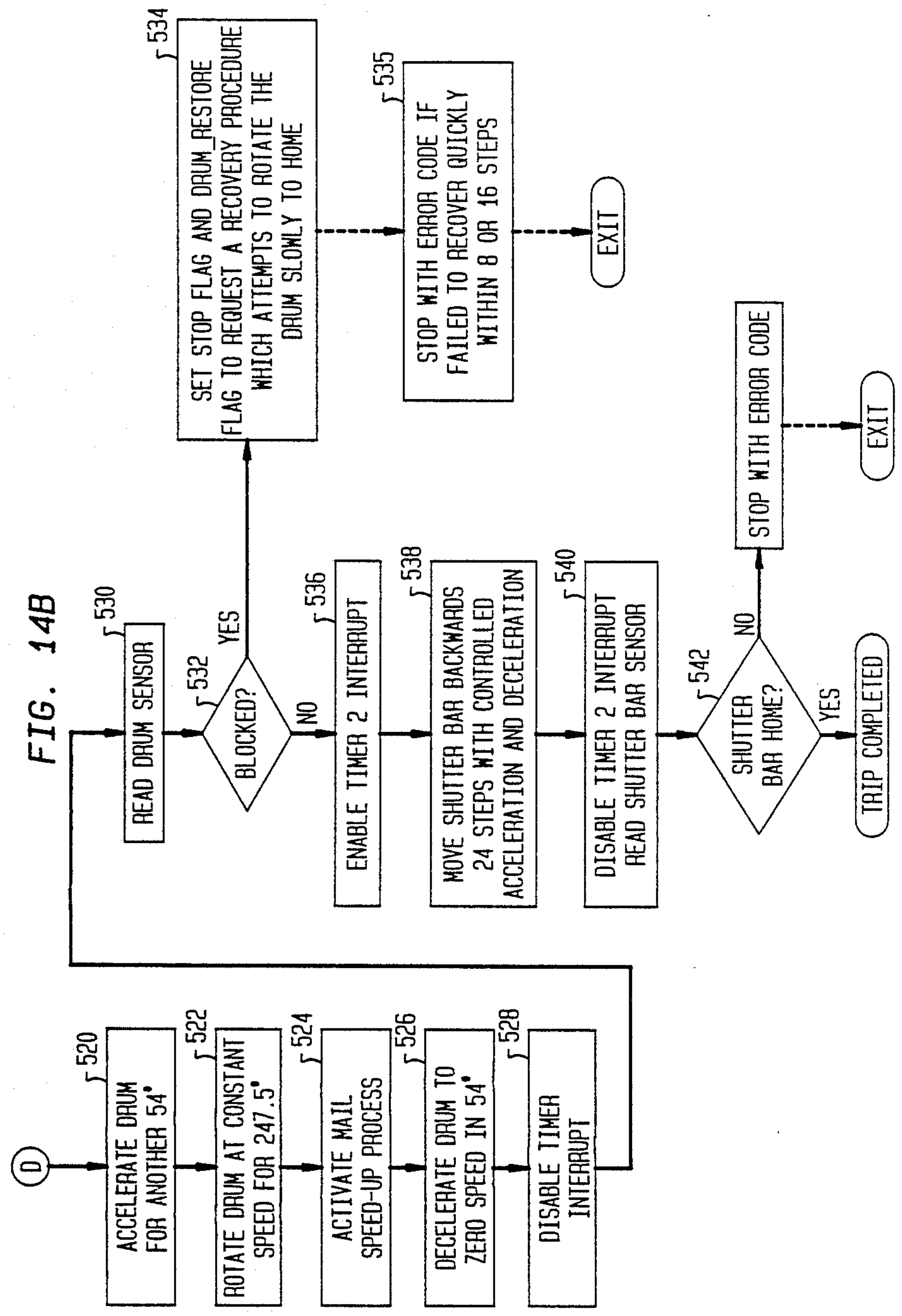

Referring to FIG. 13, upon entering the Shutdown routine 474, a decision block 476 is encountered whereupon a check of all stepper motors 24, 48 and 56 is made. If all the stepper motors are stopped the routine proceeds to logic block 494 subsequently described. If some of stepper motors are not stopped, the routine proceeds to logic block 478 whereupon all sensors 60, 62, 66, 68 and 70 are read and the sensor inputs are updated. The routine then proceeds to logic block 480 whereupon a Wait Step routine is executed, which (i) waits for the conveyor stepper motor 24 to make a step change, and (ii) triggers the watch dog circuit to prevent microprocessor resets. From logic block 480, the routine proceeds to decision block 482 whereupon a check as to whether a meter trip is in process. If a trip is in process the routine returns to logic block 478. If a trip is not in process the routine proceeds to decision block 484 whereupon a check is performed to ascertain whether the mailing machine cover 75 is open. If the cover 75 is open, the routine proceeds to logic block 490. If the cover 75 is not open, the routine proceeds to decision block 486 whereupon a check is performed to ascertain whether a mail jam is present; if a mail jam is not present the routine proceeds to logic block 488 whereupon a Loop Mail Clear routine is executed. The Loop Mail Clear routine performs the following functions; (i) continue to clear out a few more incoming letters or (ii) immediate exit if cover is open or the stop key on the keyboard 74 remains depressed. From logic block 488 the routine proceeds to logic block 490. If there is a mail jam (logic block 486), the routine proceeds to logic block 492 whereupon a Clear Jam routine is executed. The Clear Jam routine (i) sends a stop signal to the inserter 14 and (ii) attempts to clear the jam by moving the conveyor very slowly. From logic block 492, the routine proceeds to logic block 490.

At logic block 490, a Stop Roller routine is executed whereupon (i) the conveyor stepper motor is slowed to near zero speed and held at that position and (ii) all timer interrupts are disabled. From logic block 490 or from decision block 476 upon all motors being stopped, the routine enters logic block 494 whereupon a Out Stop routine is executed. The Out Stop routine (i) turns off current to the conveyor stepper motor, (ii) moves the shutter bar to the overthrow position (start up position) and (iii) re-initializes the Check Sum Process variables. From logic block 494, the routine returns to the main routine at the Idle Scan (main routine logic block 110).

Trip Process

Referring to FIGS. 11A and 11B, the trip process routine 500 is initiated by the SCHEDULER routine at logic block 500 (refer to FIGS. 11A and 11B) in the foreground. Upon actuation of the trip sensor 70 by a traversing mailpiece, the MONITOR routine at logic block 200 (refer to FIGS. 10A and 10B) set the WAIT-TRIP flag and initializes a delay counter which is decremented to zero, the SCHEDULER routine at logic block 500 calls a subroutine TRIP-METER 362. Within the TRIP-METER subroutine at logic block 362 and includes logic function at logic blocks 500, 502, 504, 506 and 508, the shutter bar sensor 60 and the drum sensor 62 are read at logic block 502. From logic block 502, the routine proceeds to decision block 504 whereupon a check is performed to ascertain whether the shutter bar 38 is at the home position. If the shutter bar is not at the home position, the routine sets the STOP-FLAG and a shutter bar error flag, then exits (i.e. returns to the SCHEDULER routine at 364). If the shutter bar 38 is at the home position, the routine proceeds to decision block 506.

At decision block 506, a check is performed to ascertain whether the print drum 32 is at the home position. If the print drum 32 is not at the home position, the routine sets the STOP-FLAG and a print drum error flag, then exits and returns to the SCHEDULER routine at 364. If the print drum 32 is at the home position, the subroutine TRIP-METER proceeds to logic block 508 whereupon timer 1 and timer 2 interrupt processes are enabled. The subroutine TRIP-METER ends here and returns to the SCHEDULER routine at 364. The trip process is then carried out by the timer 1 and timer 2 interrupt processes. The concurrent interrupt processes are indicated in the "A" and "B" branches. Branch A process encounters logic block 510 whereupon the print drum 32 is rotated by the stepper motor 18 approximately 4.5 degree slowly with very small acceleration. At the same time, branch B process encounters logic block 512 whereupon the shutter bar 38 is moved forward 24 steps with controlled acceleration and deceleration. At the end of the shutter bar of the shutter bar movement, the branch B process encounters logic block 514 whereupon timer 2 interrupt is disabled and the shutter bar and drum sensors 62 and 60 are read. At the decision blocks 516 and 518, checks are performed to ascertain whether the shutter bar 38 is at its fully forward (released) position and the drum sensor 62 is blocked. It is noted that decision block 518 is performed concurrently with the end of the logic block 510 and the print drum 32 should have been rotated 4.5 degrees to cause the drum sensor 60 to be blocked at that time. If either the shutter bar 38 is not at the fully forward position or the drum sensor is not blocked, branch B process proceeds to logic block 522 whereupon the STOP-FLAG and a DRUM REVERSE flag are set and the trip process is aborted. As discussed earlier in the RECOVERY routine 400, the DRUM-REVERSE-FLAG will trigger a recovery procedure whereupon the drum is stopped and rotated in the reverse direction to the home position, and the shutter bar 38 will also be moved backward to the home position. If the shutter bar is at the fully forward position and the drum sensor is blocked at the end of the shutter forward movement, branch A and branch B processes are merged and the trip process continues to logic block 520, and the print drum 32 is accelerated for another 54 degrees and the PEAK-DRUM-SPEED, which is also referred to as "print drum slew speed". It is noted that while the print drum 32 is being accelerated, the conveyor motor is decelerated, so the speed of the mailpiece should be equal to the PEAK-DRUM-SPEED when it approaches the print drum. The process then encounters logic block 522 whereupon the print drum 32 is rotated at the constant print drum slew speed for 247.5 degrees. The postage indicia and the advertisement slogan are printed to the envelope during this time. At the end of the constant speed rotation, the print drum 32 no longer has contact with the envelope, so the microcomputer can activate the process of speeding up the envelope in logic block 524 and starts to decelerate the print drum in logic block 526 at the same time. The conveyor motor is accelerated from the PEAK-DRUM-SPEED to the IN-SPEED, and the drum is decelerated from the PEAK-DRUM-SPEED to zero speed in 54 degrees. At the end of the drum deceleration, the print drum 32 should have been rotated 360 degrees and come back to the home position, so the program disables timer 1 interrupt and terminates the drum rotation in logic block 528. The microcomputer then reads the drum sensor in logic block 530, and proceeds to decision block 532 whereupon a check is performed to ascertain whether the drum sensor is blocked. If the drum sensor is blocked, the program proceeds to logic block 534 whereupon the STOP-FLAG and the DRUM-RESTORE flag are set. As discussed earlier in the RECOVERY routine 400, the DRUM-RESTORE flag will trigger a recovery procedure which attempts to rotate the drum slowly to home in multiples of 8 steps. If the drum is not restored to home within 8 or 16 steps, the STOP-FLAG will not be cleared and the system will be shut down with a drum error code display.

Referring to decision block 523, if the drum sensor 62 is not blocked, the trip process proceeds to logic block 536 whereupon timer 2 interrupt is enabled. This allows the microcomputer to move the shutter bar 38 backward to the home position with controlled acceleration and deceleration in logic block 538. At the end of the shutter bar 38 movement time 2 interrupt is disabled and the shutter bar sensor 60 is read in logic block 540. Subsequently at decision block 542, a check is performed to ascertain whether the shutter bar 38 is home. If the shutter bar 38 is not home the trip process is terminated with a shutter movement error flag and the STOP-FLAG set. Otherwise, the trip process is completed successfully and the system can continue to process more mail.

The afore detailed description illustrates the preferred embodiment of the invention and should not be viewed as limiting. The scope of the invention is defined by the subsequently presented claims.

What is claimed is:

1. A drive control system for an imprinting apparatus having a transport system for delivering in a seriatim manner a plurality of sheet-like members at a preselected pitch distance to an imprinting means, said imprinting means being mounted to a portion of said imprinting apparatus in such a manner as to generally define a printing station, said imprinting means having a print drum assembly, said transport system to assume displacement control over each member upon receiving said member from a feed means, said drive control system comprising:

- a first motor in driving communication with said transport system;
- a second motor in driving communication with said print drum assembly;
- a microcomputer mounted in said imprinting apparatus in controlling communication with said first and second motors for controlling the operation of said motors;
- speed sensing means for sensing the velocity at which said member is delivered to said transport system by said feed means and informing said microcomputer thereof;
- trigger sensing means for sensing the arrival of said member to a position in said transport system and informing said microcomputer thereof; and,
- said microcomputer being programmed to determine a peak drum speed as a function of the speed at which said feed means delivers said member to said transport system and the preselected pitch distance whereby said peak drum speed represents a minimum required peak drum speed,
- said microcomputer being further programmed to actuate said first motor such that said transport system is caused to obtain an initial speed equal to or greater than the speed at which said feed means delivers said member to said transport system prior to assuming control over said member, and subsequent to assuming control over said member causing said transport system to speed adjust to a speed equivalent to said peak drum speed, and subsequent to imprinting by said print drum assembly cause said transport system to speed adjust to said initial speed, and,
- said microcomputer being further programmed, based upon information received from said trigger sensing means, to delay actuation of said second motor until the leading edge of said member has traversed a trigger point whereafter said microcomputer controllably actuates said second motors to cause said print drum assembly to displace in a defined manner pursuant to a defined velocity profile under controlled acceleration such that said member's displacement is synchronous to the peak drum speed for printing by said print assembly at said printing station, said trigger point being based on achieving synchronous displacement of said member and said print drum at said printing station.

2. A drive control system for an imprinting apparatus having a transport system for delivering in a seriatim manner a plurality of sheet-like members at a preselected pitch distance to an imprinting means, said imprinting means being mounted to a portion of said imprinting apparatus in such a manner as to generally define a printing station, said imprinting means having a print drum assembly and interlock means, said transport system to assume displacement control over each member upon receiving said member from a feed means, said drive control system comprising:

- a first motor in driving communication with said transport system;
- a second motor in driving communication with said print drum assembly;
- a third motor in driving communication with said interlock assembly;
- a microcomputer mounted in said mailing machine in controlling communication with said first, second and third motors for controlling the operation of said motors;
- speed sensing means for sensing the velocity at which said member is delivered to said transport system from said feed means and informing said microcomputer thereof:
- trigger sensing means for sensing the arrival of said member to a position in said transport system and informing said microcomputer thereof; and,
- said microcomputer being programmed to determine the peak drum speed as a function of the speed at which said feed means delivers said member to said transport system and a preselected pitch distance whereby said peak drum speed represents a minimum required peak drum speed,
- said microcomputer being further programmed to actuate said first motor such that said transport system is caused to obtain an initial speed equal to or greater than the speed at which said feed means delivers said member to said transport system prior to assuming control over said member, and subsequent to assume control over said member causing said transport system to speed adjust to a speed equivalent to said peak drum speed, and subsequent to imprinting by said print drum assembly cause said transport system to speed adjust to said initial speed,
- said microcomputer being further programmed, based upon information received from said trigger sensing means, to delay actuation of said second and third motors until the leading edge of said member has traversed a trigger point whereafter said microcomputer controllably actuates said second and third motors to cause said print drum assembly and interlock means to simultaneously displace in a defined manner and pursuant to defined velocity profiles under controlled acceleration such that said member's displacement to the peak drum speed for printing by said print drum assembly at said printing station, said trigger point being based on achieving synchronous displacement of said member, said print drum assembly and said interlock means at said printing station.

3. A drive control system as claimed in claim 2, wherein said microcomputer further includes means for detecting a jam of said members in said transport system and in response thereto causing said first motor to shut down said transport system provided a lead one of said members has not tripped said trigger sensing means, if said trigger sensing means has been triggered said means to shut down said transport system after said lead member has traversed said printing station.

4. A drive control system as claimed in claim 2 or 3, wherein said microcomputer further includes means for detecting the orientation of said members, under the control of said transport system such that should any one of said members be improperly oriented within said transport system said microcomputer will shut down said transport system.

5. A drive control system for a mailing machine having a transport system for delivering in a seriatim manner a plurality of envelopes at a preselected pitch distance to a postage meter, said postage meter said mailing machine being mounted to a portion of said mailing machine to generally define a printing station, said postage meter having a print drum assembly, a shutter bar assembly and a shutter bar interlock assembly, said transport assembly to assume displacement control over each envelope upon receiving said envelope from a feed means, said drive control system comprising:

a first motor in driving communication with said transport system;

a second motor in driving communication with said print drum assembly;

a third motor in driving communication with said shutter bar assembly;

a microcomputer mounted in said mailing machine in controlling communication with said first, second and third motors for controlling the operation of said motors and in communication with said feed means;

speed sensing means for sensing the velocity at which said envelope is delivered to said transport system by said feed means and informing said microcomputer thereof;

trigger sensing means for sensing the arrival of said envelope to a position in said transport system and informing said microcomputer thereof; and, (a) said microcomputer being programmed to determine a peak drum speed as a function of the speed at which said feed means delivers said envelope to said transport system and the preselected pitch distance whereby said peak drum speed represents a minimum required peak drum speed, (b) said microcomputer being further programmed to actuate said first motor such that said transport system obtains an initial speed equal to or greater than the speed at which said feed means delivers said envelope to said transport system prior to assuming control over said envelope and subsequent to assume control over said envelope causing said transport system to speed adjust to a speed equivalent to said peak drum speed, and subsequent to imprinting by said print drum assembly to cause said transport system to speed adjust to said initial speed, (C) said microcomputer being further programmed, based upon information received from said trigger sensing means, to delay actuation of said second and third motors until the leading edge of said envelope has traversed a triggered point whereafter said microcomputer controllably actuates said second and third motors to cause said print drum assembly, shutter bar and shutter bar interlock means to displace in a defined manner and pursuant to defined velocity profiles under controlled acceleration, such that said envelope's displacement is synchronous to the peak drum speed for printing by said print drum assembly at said printing station, said trigger point being based on achieving synchronous displacement of said envelope and said print drum assembly at said printing station.

6. A drive control system as claimed in claim 5, wherein said microcomputer further includes sensing means for informing said microcomputer whether said print drum assembly and shutter bar assembly are in the home position such that should said shutter bar interlock means fial to release said shutter bar assembly upon the initiation of a trip pursuant to information supplied by said sensing means, said microcomputer will cause said print drum assembly and shutter bar assembly to return to the home position and reinitiate if said interlock means now fails to release said shutter bar assembly said microcomputer shuts down the transport system.

7. A control system as claimed in claim 7 wherein said microcomputer further includes said trigger sensing means having a plurality of sensor mounted on said transport system and means for determining whether said envelope received by said transport means is improperly skewed by monitoring the time duration in which said trigger sensors are blocked by said envelope.

8. A Control system as claimed in claim 7, wherein said microcomputer further includes means for determining whether a envelope has jammed in the transport system and attempting to unjam the envelope prior to system shut down.

* * * * *